United States Patent
Zhang et al.

(10) Patent No.: US 12,461,947 B2
(45) Date of Patent: Nov. 4, 2025

(54) ACCESS AUTHORIZATION FOR REPORT DATA IN A MULTI-TENANCY DATA MANAGEMENT SYSTEM

(71) Applicant: Rubrik, Inc., Palo Alto, CA (US)

(72) Inventors: Zhebin Zhang, San Jose, CA (US); Hao Wu, Mountain View, CA (US); Kevin Mu, Saratoga, CA (US); Xiang Xu, Foster City, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/102,315

(22) Filed: Jan. 27, 2023

(65) Prior Publication Data

US 2024/0256575 A1    Aug. 1, 2024

(51) Int. Cl.
*G06F 16/28* (2019.01)

(52) U.S. Cl.
CPC .......... *G06F 16/287* (2019.01); *G06F 16/282* (2019.01)

(58) Field of Classification Search
None
See application file for complete search history.

(56) References Cited

U.S. PATENT DOCUMENTS

| | | | | |
|---|---|---|---|---|
| 5,878,415 A * | 3/1999 | Olds | .................... | G06F 21/6218 |
| | | | | 707/999.009 |
| 10,747,438 B1 * | 8/2020 | Donohue | .............. | G06F 3/0685 |
| 11,315,041 B1 * | 4/2022 | Jain | ........................ | G06N 20/20 |
| 2002/0107875 A1 | 8/2002 | Seliger et al. | | |
| 2004/0210755 A1 * | 10/2004 | Becker | ................... | G16H 10/60 |
| | | | | 713/167 |
| 2005/0257066 A1 * | 11/2005 | John | .................... | G06F 21/6227 |
| | | | | 713/182 |

(Continued)

FOREIGN PATENT DOCUMENTS

| | | | | |
|---|---|---|---|---|
| CN | 111684440 A | * | 9/2020 | ......... G06F 16/2282 |
| CN | 111865943 A | | 10/2020 | |

(Continued)

OTHER PUBLICATIONS

Hierarchical Multi-Tenant Pattern, Bien et al , Characterizing the Performance of Tenant Data Management in Multi-Tenant Cloud Authorization Systems (Year: 2014).*

(Continued)

*Primary Examiner* — Augustine K. Obisesan
(74) *Attorney, Agent, or Firm* — Holland & Hart LLP

(57) ABSTRACT

Methods, systems, and devices for data management are described. A multi-tenancy data management system (DMS) may include multiple computing objects organized as a hierarchy of computing objects. The DMS may receive a request for report data associated with a first set of computing objects of the DMS. The DMS may identify context information for a log-in session associated with the request. The context information may include a tenant identifier (ID) for a tenant associated with the request. The DMS may apply a filter to the first set of computing objects. The filter may be based on a second set of computing objects to which the tenant has access within the hierarchy of computing objects. The DMS may output the report data for at least one computing object of the first set based on the at least one computing object being included in the second set of computing objects.

17 Claims, 14 Drawing Sheets

(56) References Cited

U.S. PATENT DOCUMENTS

| | | | |
|---|---|---|---|
| 2006/0294051 A1* | 12/2006 | Kapadia | G06F 16/954 |
| 2007/0136603 A1 | 6/2007 | Kuecuekyan | |
| 2009/0282045 A1* | 11/2009 | Hsieh | H04L 63/104 |
| | | | 707/999.009 |
| 2010/0319067 A1* | 12/2010 | Mohanty | H04L 63/101 |
| | | | 726/21 |
| 2011/0030038 A1 | 2/2011 | Dillaway | |
| 2011/0213789 A1* | 9/2011 | Doshi | G06F 21/6218 |
| | | | 707/754 |
| 2011/0239293 A1 | 9/2011 | Perumal et al. | |
| 2014/0068732 A1 | 3/2014 | Hinton et al. | |
| 2015/0073858 A1 | 3/2015 | Philip et al. | |
| 2016/0057150 A1 | 2/2016 | Choi et al. | |
| 2016/0259807 A1* | 9/2016 | Factor | G06F 9/00 |
| 2017/0242881 A1* | 8/2017 | Northfleet | G06F 16/2282 |
| 2017/0371942 A1* | 12/2017 | Baumgaertel | G06F 16/215 |
| 2018/0046637 A1* | 2/2018 | Koopman | G06F 16/9558 |
| 2019/0364051 A1 | 11/2019 | Ferrans et al. | |
| 2020/0120098 A1* | 4/2020 | Berg | H04L 63/104 |
| 2020/0344109 A1 | 10/2020 | Shil | |
| 2020/0404021 A1 | 12/2020 | Singh et al. | |
| 2022/0318074 A1* | 10/2022 | Kompaniets | G06F 16/951 |
| 2022/0343707 A1 | 10/2022 | Johnson et al. | |

FOREIGN PATENT DOCUMENTS

| | | | |
|---|---|---|---|
| JP | 2009-259214 A | 11/2009 | |
| WO | WO-2014188743 A1 * | 11/2014 | G06F 21/6218 |

OTHER PUBLICATIONS

Characterizing the Performance of Tenant Data Management in Multi-Tenant Cloud Authorization Systems, Maenhaut et al, IEEE 2014 (Year: 2014).*

* cited by examiner

ACCESS AUTHORIZATION FOR REPORT DATA IN A MULTI-TENANCY DATA MANAGEMENT SYSTEM

FIELD OF TECHNOLOGY

The present disclosure relates generally to data management, including techniques for access authorization for report data in a multi-tenancy data management system (DMS).

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
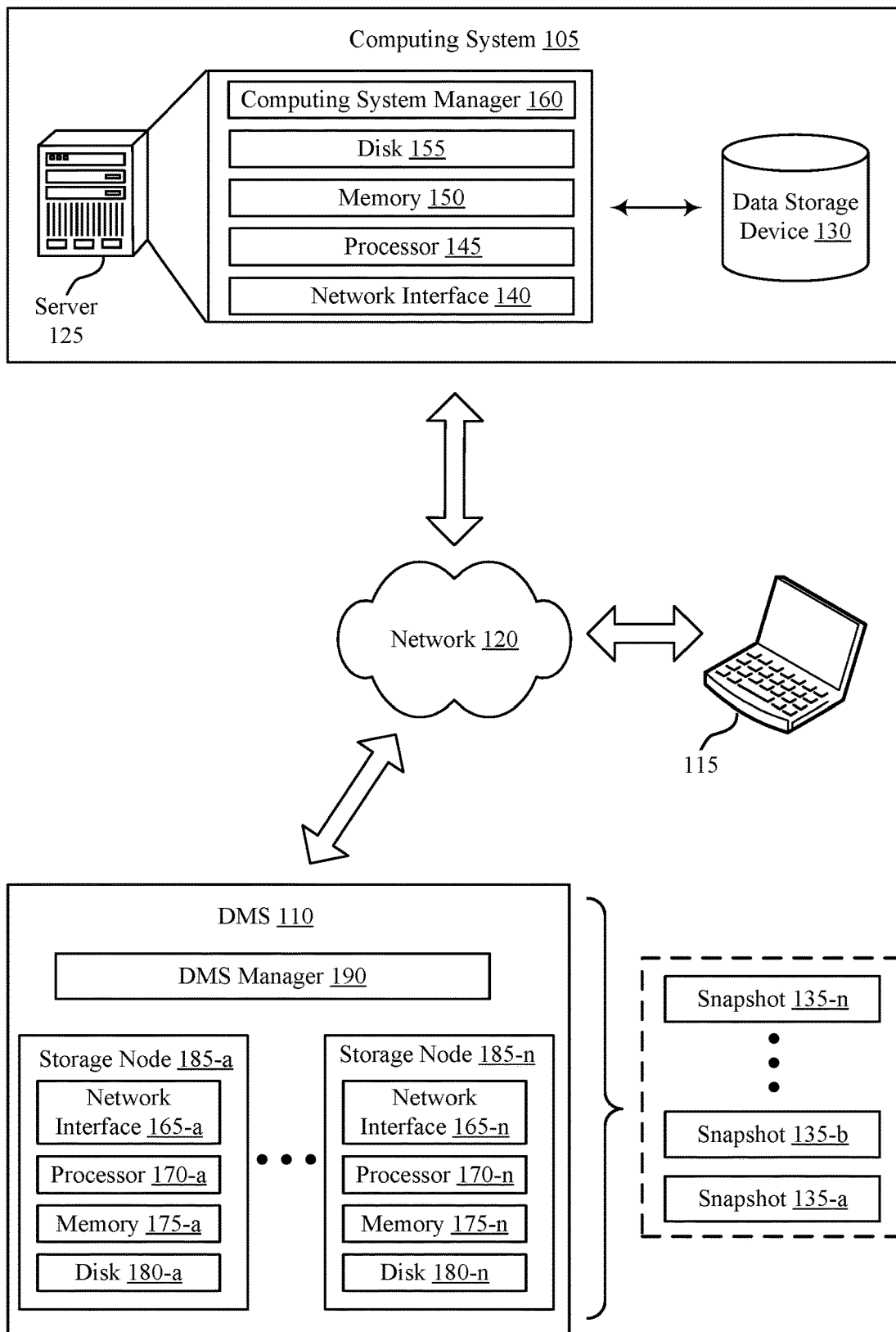
FIG. 1 illustrates an example of a computing environment that supports access authorization for report data in a multi-tenancy data management system (DMS) in accordance with aspects of the present disclosure.

A multi-tenancy data management system (DMS) may provide backup services for multiple tenants (e.g., organizations or business units). A multi-tenancy DMS also may have resources across cloud platforms and on-premise data centers. In multi-tenant scenarios, multiple tenants (e.g., organizations or business units) may share data management resources. Some multi-tenant scenarios may be multi-level, with multiple hierarchical levels of tenants. For example, resources of a backup and recovery system may be shared among multiple higher-level tenants, and at least some of the higher-level tenants may be associated with one or more levels of lower-level tenants (e.g., subtenants), with resources associated with a higher-level tenant being shared by multiple subtenants of that tenant.

As one such example, which may be referred to as an enterprise scenario, an information technology (IT) services unit of a business (e.g., of a corporation) may be a tenant of a DMS, and multiple other business units of the same business (e.g., within the same corporation) may be subtenants of the IT services unit, and accordingly, may share the same data management services. As another such example, some tenants of a DMS may be multi-service providers (MSPs). An MSP may be a higher-level tenant of a backup and recovery system and may provide IT and data management services to multiple distinct customers, which may be separate businesses that are subtenants of the MSPs. For example, the MSP may subscribe to data management services and resources from the d DMS, and the MSP may use those services and resources to in turn provide data management service to the MSP's subtenants (e.g., an MSP subtenant may not directly subscribe to the DMS, such as due to a lack of internal expertise in configuring or managing the resources or services of the DMS, and thus the MSP subtenant may instead be customer of the MSP, which may directly subscribe to the DMS and use the MSP's subscription to offer data management services to the MSP subtenant).

There may be many tenants of the DMS, and some or all of the tenants may have any number of subtenants. The tenants of the DMS may be enterprise tenants, MSP tenants, other types of entities, or any combination thereof. Further, an entity that is a subtenant of a higher-level tenant may itself have one or more subtenants. That is, there may be three or more levels of tenants—in general, any quantity of levels may exist.

In some examples, a DMS may obtain and store report data for computing objects in the multi-tenant system, the computing objects being resources or other entities within the DMS (e.g., clusters or portions of clusters). The report data may include, for example, a status of the computing objects, such as a compliance status, a size, a status or history of one or more tasks related to the computing objects, or any combination thereof.

Techniques, systems, and devices described herein provide for a DMS to determine whether a user has permission to access report data for a given computing object based on the tenant associated with a given log-in session by the user. Computing objects within the DMS may be organized as part of an object hierarchy. If a tenant is granted access to one object within the object hierarchy, the tenant automatically also has access to any other object that is below that object within the object hierarchy. The user may log in to establish a session with the DMS. During the session, the user (e.g., an administrator for a given tenant, or some other user of the tenant) may request to access report data for a first set of one or more computing objects. In response to the request, the DMS may determine an identifier (ID) of the user and an ID of the tenant to which the user is logged in based on context information associated with the user's log-in session via which the request is sent. The tenant may have access to (e.g., permission or authorization to access) a second set of computing objects within the object hierarchy. The DMS may filter through the first set of computing objects associated with the requested report data by filtering out or omitting computing objects that are not in the second set of computing objects to which the tenant has access. The DMS may determine that the user has permission to access the requested report data for the remaining computing objects that are included in the second set of objects (e.g., are assigned to or accessible by the tenant) and may output such report data to the user accordingly.

In some examples, when the DMS generates and stores the report data for a given computing object, the DMS may add a field in the report data that indicates an ID of the corresponding computing object. The DMS may generate a mapping table for mapping object IDs to corresponding tenants that have access to the objects based on the computing object hierarchy. Accordingly, higher-level tenants may be able to request that the DMS display report data that is filtered by subtenants. For example, if a tenant requests to view all report data associated with a first subtenant, the DMS may scan the mapping table using a tenant ID of the first subtenant to determine computing object IDs of computing objects that the first subtenant has access to in the computing object hierarchy. The DMS may filter through a database of report data stored at the DMS using the identified computing object IDs. The DMS may output, to a user of the tenant that requested the report data for the first subtenant, all of the report data that includes the computing object IDs. The described techniques may thereby provide for the DMS to retrieve and provide report data with improved reliability, security, and efficiency.

FIG. 1 illustrates an example of a computing environment 100 that supports access authorization for report data in a multi-tenancy DMS in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target data sources within the computing system 105. A snapshot 135 of a data source (e.g., a virtual machine, a database, a filesystem, a virtual disk, a virtual desktop, or other type of computing system or storage system) may be a file (or set of files) that represents a state of the data source (e.g., the data thereof) as of a particular point in time. A snapshot 135 may also be used to restore (e.g., recover) the corresponding data source as of the particular point in time corresponding to the snapshot 135. A data source of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the data source as of a particular point in time. For example, a snapshot 135 may include metadata associated with (e.g., that defines a state of) some or all data blocks included in (e.g., stored by or otherwise included in) the data source. Snapshots 135 (e.g., collectively) may capture changes in the data blocks over time. Snapshots 135 generated for the target data sources within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target data source associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target data source into a frozen state (e.g. a read-only state). Setting the target data source into a frozen state may allow a point-in-time snapshot 135 of the target data source to be stored or transferred.

In some examples, the computing system 105 may generate the snapshot 135 based on the frozen state of the data source. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target data source, and the DMS 110 may generate a snapshot 135 of the target data source based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target data source that has been set into a frozen state may be written by the computing system 105 to a separate file (e.g., an update file) or other entity within the computing system 105 while the target data source is in the frozen state. After the snapshot 135 (or associated data) of the target data source has been transferred to the DMS 110, the computing system manager 160 may release the target data source from the frozen state, and any corresponding updates written to the separate file or other entity may be merged into the target data source.

In response to a restore command (e.g., from a computing device 115 or the computing system 105), the DMS 110 may restore a target version (e.g., corresponding to a particular point in time) of a data source based on a corresponding snapshot 135 of the data source. In some examples, the corresponding snapshot 135 may be used to restore the target version based on data of the data source as stored at the computing system 105 (e.g., based on information included in the corresponding snapshot 135 and other information stored at the computing system 105, the data source may be restored to its state as of the particular point in time). Additionally or alternatively, the corresponding snapshot 135 may be used to restore the data of the target version based on data of the data source as included in one or more backup copies of the data source (e.g., file-level backup copies or image-level backup copies). Such backup copies of the data source may be generated in conjunction with or according to a separate schedule than the snapshots 135. For example, the target version of the data source may be restored based on the information in a snapshot 135 and based on information included in a backup copy of the target object generated prior to the time corresponding to the target version. Backup copies of the data source may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the data source and transfer the data of the restored data source to the computing system 105. And in some examples, the DMS 110 may transfer one or more snapshots 135 to the computing system 105, and restoration of the target version of the data source may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a data source based on a snapshot 135 corresponding to the data source (e.g., along with data included in a backup copy of the data source) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the data source for access by the computing system 105, the DMS 110, or the computing device 115.

In some examples, the DMS 110 may store different types of snapshots, including for the same data source. For example, the DMS 110 may store both base snapshots 135 and incremental snapshots 135. A base snapshot 135 may represent the entirety of the state of the corresponding data source as of a point in time corresponding to the base snapshot 135. An incremental snapshot 135 may represent the changes to the state-which may be referred to as the delta—of the corresponding data source that have occurred between an earlier or later point in time corresponding to another snapshot 135 (e.g., another base snapshot 135 or incremental snapshot 135) of the data source and the incremental snapshot 135. In some cases, some incremental snapshots 135 may be forward-incremental snapshots 135 and other incremental snapshots 135 may be reverse-incremental snapshots 135. To generate a full snapshot 135 of a data source using a forward-incremental snapshot 135, the information of the forward-incremental snapshot 135 may be combined with (e.g., applied to) the information of an earlier base snapshot 135 of the data source along with the information of any intervening forward-incremental snapshots 135, where the earlier base snapshot 135 may include a base snapshot 135 and one or more reverse-incremental or forward-incremental snapshots 135. To generate a full snapshot 135 of a data source using a reverse-incremental snapshot 135, the information of the reverse-incremental snapshot 135 may be combined with (e.g., applied to) the information of a later base snapshot 135 of the data source along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more data sources of the computing system 105, metadata for one or more data sources of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated data source within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110 may be a multi-tenancy DMS 110 that may provide backup services for multiple tenants (e.g., organizations or business units). The tenants may be organized into a hierarchy of tenants. For example, resources of the DMS 110 may be shared among multiple higher-level tenants, and at least some of the higher-level tenants may be associated with one or more levels of lower-level tenants (e.g., subtenants), with resources associated with a higher-level tenant being shared by multiple subtenants of that tenant. The DMS 110 may obtain and store report data for computing objects in the multi-tenant system, the computing objects being resources or other entities within the DMS 110 (e.g., clusters, storage nodes 185, or portions of clusters or storage nodes 185). The report data may include, for example, a status of the computing objects, such as a compliance status, a size, a status or history of one or more tasks related to the computing objects, or any combination thereof.

Techniques, systems, and devices described herein provide for the DMS 110 to determine whether a user has permission to access report data for a given computing object based on the tenant associated with a given log-in session by the user. Computing objects within the DMS 110 may be organized as part of an object hierarchy. If a tenant is granted access to one object within the object hierarchy, the tenant automatically also has access to any other object that is below that object within the object hierarchy. The user may log in to establish a session with the DMS 110. During the session, the user (e.g., an administrator for a given tenant, or some other user of the tenant) may request to access report data for a first set of one or more computing objects. In response to the request, the DMS 110 may determine an ID of the user and an ID of the tenant to which the user is logged in based on context information associated with the user's log-in session via which the request is sent. The tenant may have access to (e.g., permission or authorization to access) a second set of computing objects within the object hierarchy. The DMS 110 may filter through the first set of computing objects associated with the requested report data by filtering out or omitting computing objects that are not in the second set of computing objects to which the tenant has access. The DMS 110 may determine that the user has permission to access the requested report data for the remaining computing objects that are included in the second set of objects (e.g., are assigned to or accessible by the tenant) and may output such report data to the user accordingly.

In some examples, when the DMS 110 generates and stores the report data for a given computing object, the DMS 110 may add a field in the report data that indicates an ID of the corresponding computing object. The DMS 110 may generate a mapping table for mapping object IDs to corresponding tenants that have access to the objects based on the computing object hierarchy. Accordingly, higher-level tenants may be able to request that the DMS 110 display report data that is filtered by subtenants. For example, if a tenant requests to view all report data associated with a first subtenant, the DMS 110 may scan the mapping table using a tenant ID of the first subtenant to determine computing object IDs of computing objects that the first subtenant has access to in the computing object hierarchy. The DMS 110 may filter through a database of report data stored at the DMS 110 using the identified computing object IDs. The DMS 110 may output, to a user of the tenant that requested the report data for the first subtenant, all of the report data that includes the computing object IDs. The described techniques may thereby provide for the DMS 110 to retrieve and provide report data with improved reliability, security, and efficiency.

Figure 2:
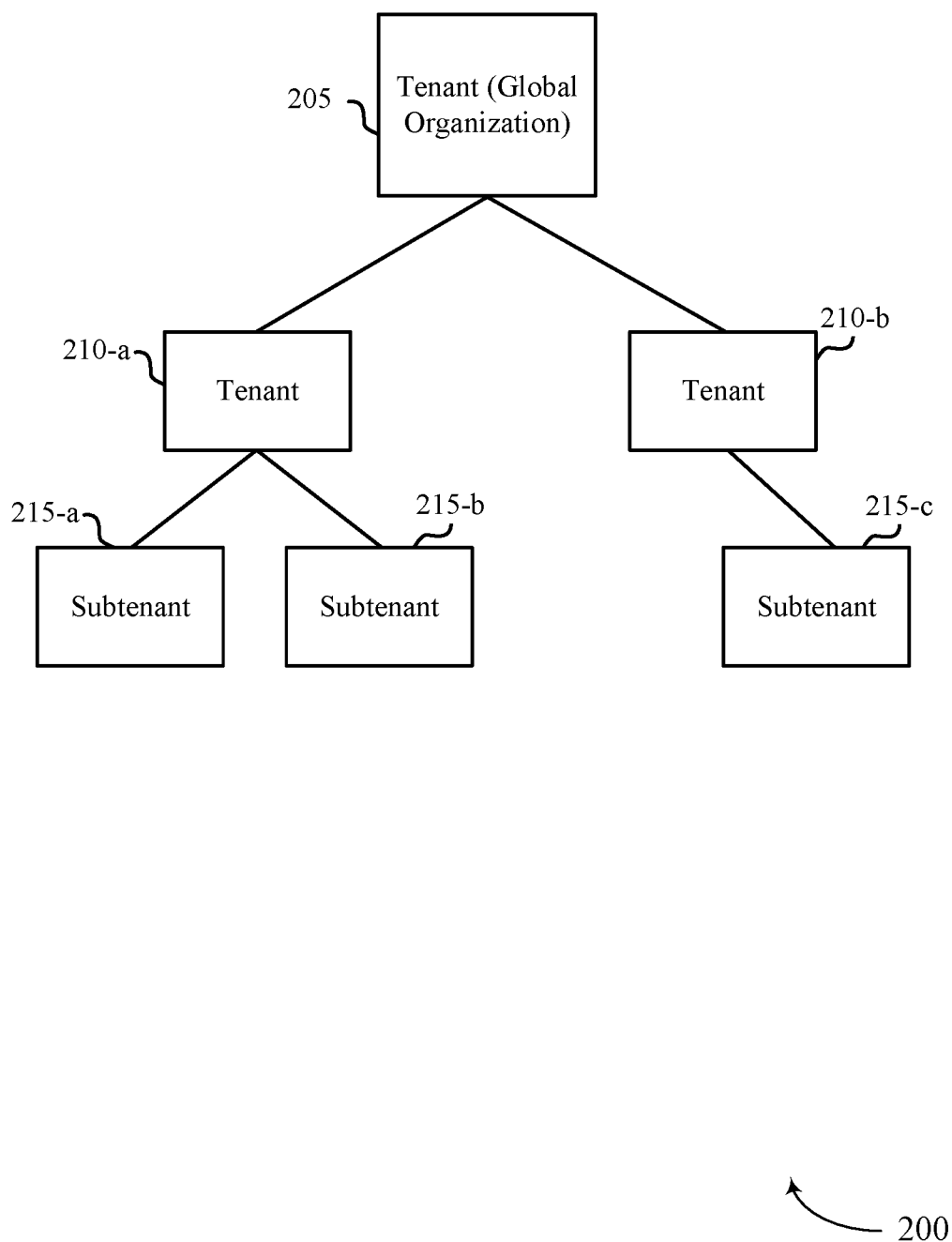
FIG. 2 illustrates an example of a multi-tenancy system that supports access authorization for report data in a multi-tenancy DMS in accordance with aspects of the present disclosure.

FIG. 2 illustrates an example of a multi-tenancy system 200 that supports access authorization for report data in a multi-tenancy DMS in accordance with aspects of the present disclosure. The multi-tenancy system 200 may implement or be implemented by aspects of the computing environment 100 described with reference to FIG. 1. For example, a DMS 110 may provide backup and recovery protection for data sources for multiple tenants and/or subtenants.

As described herein, a global organization (e.g., a tenant 205) may provide IT services, including backup and recovery protection via a DMS 110, to multiple tenants (e.g., tenant 210-a and tenant 210-b). Additionally, each tenant may further have subtenants. For example, the tenant 210-a may have a subtenant 215-a and a subtenant 215-b. For example, the tenant 205 may be the IT services unit of an organization, and the tenant 210-a and the tenant 210-b may be business units of or teams within the organization. The subtenant 215-a and the subtenant 215-b may be sub-business units or sub-teams of the business unit corresponding to the tenant 210-a (e.g., working groups within the business unit). The subtenant 215-c similarly may be a sub-business unit or sub-teams of the business unit corresponding to the tenant 210-b. As another example, the tenant 205 may be an MSP, and the tenant 210-a and the tenant 210-b may be different enterprises/customers (e.g., organizations) of the MSP. The subtenant 215-a, the subtenant 215-b, and the subtenant 215-c may be business units and/or working groups/entities/teams of the enterprises/customers corresponding to the tenant 210-a and the tenant 210-b.

In some examples, the tenant 205 corresponds to a DMS 110 that controls backup and recovery resources that are used to provide backup and recovery protection to the various tenants 210-a and sub tenants 215 of the organization. An administrative user of the tenant 205 may access the DMS 110 to configure and allocate resources (e.g., computing objects) that are used to support backup and recovery for data sources associated with the various tenants and subtenants. For example, the user may access a user interface of the DMS 110 to create the tenants 210-a and 210-b and to assign the respective backup and recovery resources to the created tenants 210-a and 210-b. Assignment of resources to a tenant may include updating metadata (e.g., RBAC metadata) associated with the respective resources to indicate respective tenant or subtenant assignments. In some cases, the administrative user may assign, to a tenant or subtenant using the user interface of the DMS 110, a data source that is to be backed-up using a respective resource, a backup or recovery procedure that may be performed using the respective resource, and/or a storage capacity for the backup and recovery resource. Assignment of a data source, procedure, or capacity may include updating the metadata (e.g., RBAC metadata) associated with the backup and recovery resource (e.g., computing object) that is to be used by the tenant or subtenant.

In some cases, the administrative user may access the user interface of the DMS 110 to assign users to the tenants 210 or subtenants 215. For example, the administrative user of the tenant 205 may assign a second administrative user to the tenant 210-a such that the second administrative user may access the platform for backup and recovery management, as well as further subtenant creation and resource assignment, data source assignment, procedure assignment, and capacity assignment. A third demonstrative user may be similarly assigned to the tenant 210-b. User assignment may be restricted or controlled based on hierarchical techniques, as described herein with respect to computing object assignment.

As described herein, users may access a user interface associated the DMS 110 to control various backup and recovery aspects related to a tenant 205 or 210 or subtenant 215. In some examples, the user interface may be supported by a platform or application that is used to manage multiple DMSs 110, multiple tenants 205, subtenants 215, etc. In some examples, an authorized user may access the platform or application to control backup and recovery procedures, as well as tenant or subtenant creation and assignment. Each tenant 205 or 210 or subtenant 215 may be associated with a "context" of the platform or application. An application context refers to a state of an application that allows a user to manage to control aspects of backup and recovery associated with a particular tenant 205 or 210 or subtenant 215. Thus, a user may access an application context associated with the tenant 210-a and the user may view resources, procedures, etc. that are assigned to the tenant 210-a as well as create subtenants of the tenant 210-a (e.g. subtenants 215-a and 215-b) and assign subsets of resources to the created subtenants. Thus, when discussing a user accessing a user interface of the DMS 110 herein, the user may access the application context associated with a tenant or subtenant to perform various functions and procedures described herein.

The DMS 110 may provide for an RBAC scheme such that users associated with each tenant/subtenant may access only the computing objects assigned to the given tenant/subtenant. Accordingly, the tenants 210 and subtenants 215 may share a single DMS 110 and/or a single data management cluster without unauthorized access by any tenant 210 or subtenant 215 to computing objects or files assigned to a different tenant 210 or subtenant 215. For example, one business unit of an enterprise may not access computing objects or files assigned to a different business unit of the enterprise. As another example, one customer of an MSP may not access computing objects or files assigned to a different customer of the MSP.

In accordance with aspects of the present disclosure, the DMS 110 may receive, at a user interface associated with the DMS 110, a request, by a user of the DMS 110, to access report data for a first set of one or more computing objects of the DMS 110. In response to the request, the DMS 110 may determine an ID of the user and an ID of the tenant 210 to which the user is logged in based on context information associated with the user's log-in session via which the request is sent. The tenant 210 may have access to (e.g., permission or authorization to access) a second set of computing objects within an object hierarchy of the DMS 110. The DMS 110 may filter through the first set of computing objects associated with the requested report data by filtering out or omitting computing objects that are not in the second set of computing objects to which the tenant 210 has access. The DMS 110 may determine that the user has permission to access the requested report data for the remaining computing objects that are included in the second set of objects (e.g., are assigned to or accessible by the tenant) and may output such report data to the user accordingly.

In some examples, when the DMS 110 generates and stores the report data for a given computing object, the DMS 110 may add a field in the report data that indicates an ID of the corresponding computing object. The DMS 110 may generate a mapping table for mapping object IDs to corresponding tenants 210 that have access to the objects based on the computing object hierarchy. Accordingly, higher-level tenants 210, such as the tenant 210-a, may be able to request that the DMS 110 display report data that is filtered by subtenants 215, such as the subtenant 215-a, the subtenant 215-b, or both. For example, if the tenant 210-a requests to view all report data associated with the subtenant 215-a, the DMS 110 may scan the mapping table using a tenant ID of the subtenant 215-a to determine computing object IDs of computing objects that the subtenant 215-a has access to in the computing object hierarchy. The DMS 110 may filter through a database of report data stored at the DMS 110 using the identified computing object IDs. The DMS 110 may output, to a user of the tenant 210-a that requested the report data for the subtenant 215-*a*, all of the report data that includes the computing object IDs. In some examples, the user of the tenant 210-*a* may request to view all report data for a group or set of two or more subtenants 215 of the tenant 210-*a*, and the DMS 110 may filter the report data accordingly. The described techniques may thereby provide for the DMS 110 to retrieve and provide report data with improved reliability, security, and efficiency.

Figure 3:
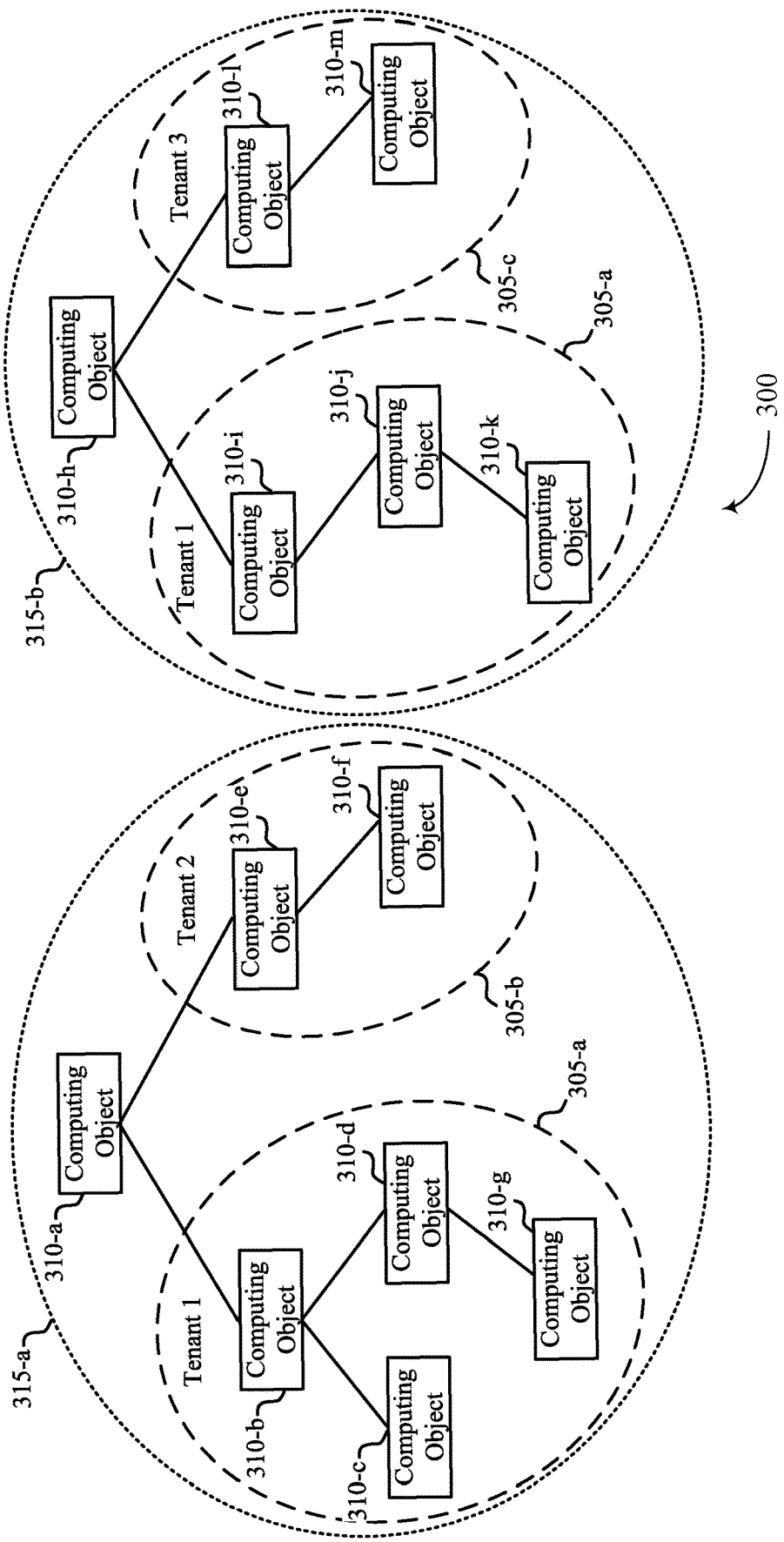
FIG. 3 illustrates an example of a computing object hierarchy that supports access authorization for report data in a multi-tenancy DMS in accordance with aspects of the present disclosure.

FIG. 3 illustrates an example of a computing object hierarchy 300 that supports access authorization for report data in a multi-tenancy DMS in accordance with aspects of the present disclosure. The computing object hierarchy 300 may implement or be implemented by aspects of the computing environment 100 described with reference to FIG. 1. For example, a DMS 110 may provide backup and recovery protection for data sources for multiple tenants and/or subtenants via one or more data management clusters. For example, FIG. 3 illustrates a first data management cluster 315-*a* and a second data management cluster 315-*b*, which may provide protection for data sources associated with a first tenant 305-*a*, a second tenant 305-*b*, and a third tenant 305-*c*.

Each of the first data management cluster 315-*a* and the second data management cluster 315-*b* may include a set of computing objects (e.g., resources such as virtual machines or databases) which may be organized according to a hierarchical relationship. For example, the first data management cluster 315-*a* may include the computing object 310-*a*, which has as descendants the computing object 310-*b* and the computing object 310-*e*. The computing object 310-*b* has as descendants the computing object 310-*c* and the computing object 310-*d*, and the computing object 310-*d* further has as a descendant the computing object 310-*g*. The computing object 310-*e* has as a descendent the computing object 310-*f*.

The second data management cluster 315-*b* may include the computing object 310-*h*, which has as descendants the computing object 310-*i* and the computing object 310-1. The computing object 310-*i* has as a descendant the computing object 310-*j*, and the computing object 310-*j* further has as a descendant the computing object 310-*k*. The computing object 310-1 has as a descendent the computing object 310-*m*.

As described herein, the multiple tenants (the first tenant 305-*a*, the second tenant 305-*b*, and the third tenant 305-*c*) may share data management resources. More specifically, multiple tenants of a DMS 110 may share computing objects 310 of a same data management clusters 315. For example, the first tenant 305-*a* and the second tenant 305-*b* may both be assigned computing objects 310 within the first data management cluster 315-*a*, and the first tenant 305-*a* and the third tenant 305-*c* may both be assigned computing objects 310 within the second data management cluster 315-*b*. The assignment of computing objects 310 of the data management clusters 315 may respect the hierarchical relationship among the computing objects 310. For example, assignment of a top-level computing object such as the computing object 310-*b* to the first tenant 305-*a* may result in assignment of (e.g., an implicit assignment of) the computing object 310-*c*, the computing object 310-*d*, and the computing object 310-*g* to the first tenant 305-*a*, as the computing object 310-*c*, the computing object 310-*d*, and the computing object 310-*g* are descendants of the computing object 310-*b* within the computing object hierarchy of the first data management cluster 315-*a*. Similarly, assignment of the computing object 310-*e* to the second tenant 305-*b* may result in assignment of the computing object 310-*f* to the second tenant 305-*b*. As another example, assignment of the computing object 310-*i* to the first tenant 305-*a* may result in assignment of the computing object 310-*j* and the computing object 310-*k* to the first tenant 305-*a*. As another example, assignment of the computing object 310-1 to the third tenant 305-*c* may result in assignment of the computing object 310-*m* to the third tenant 305-*c*. Such implicit assignment of resources based on the computing object hierarchy may simplify management of the DMS 110 for an administrator (e.g., an IT services unit or an MSP). For example, an MSP may assign a full data management cluster 315 to a tenant to achieve assignment of all backup computing objects from that data management cluster 315 to the tenant. As another example, an MSP may assign a Vcenter from a data management cluster 315 to assign all of the virtual machines from that Vcenter to the tenant.

As described herein, the DMS 110 may provide for a multi-tenancy RBAC scheme such that users associated with each tenant/subtenant may access only the computing objects assigned to the given tenant/subtenant. Multi-tenancy RBAC supports in-depth computing object level access control granularity for data management systems such as the DMS 110 with multiple data management clusters. Multi-tenancy RBAC supports both authorizing a full data management cluster 315 to a tenant (e.g., assigning all of the computing objects 310 of a given data management cluster 315 to a given tenant), and assignment of specific computing objects 310 of a data management cluster 315 to a given tenant. A user associated with the first tenant 305-*a* may not access computing objects assigned to the second tenant 305-*b* or the third tenant 305-*c*, a user associated with the second tenant 305-*b* may not access computing objects assigned to the first tenant 305-*a* or the third tenant 305-*c*, and a user associated with the third tenant 305-*c* may not access computing objects assigned to the first tenant 305-*a* or the second tenant 305-*b*. For example, a tenant dashboard (e.g., a user interface view for a tenant account at a computing device 115) may show relevant statistics and information regarding authorized computing objects 310 for that tenant, and the tenant may only manage data backup for the authorized computing objects 310. The multi-tenancy RBAC may prevent information leakage across tenants via enforcing access control at all user interfaces, events, audits, reports, etc., for a tenant, such that a tenant is not able to view or access direct or aggregated information about computing objects 310 that are not assigned to that tenant. A tenant may not bypass the access control enforcement in either the control plane or the cluster side via federated login.

As an example, an MSP account with multiple cloud accounts or on-premise data management clusters (e.g., the first data management cluster 315-*a* may be a first cloud account or on-premise data management cluster of the MSP and the second data management cluster 315-*b* may be a second cloud account or on-premise data management cluster of the MSP), and the MSP may assign a specific computing object 310 within the multiple cloud accounts or on-premise data management clusters of the MSP to a given tenant (e.g., customer) of the MSP. Further, multi-tenancy RBAC may authorize different permissions (e.g., read-only, read-write) on different computing objects 310. For example, a tenant (e.g., the first tenant 305-*a*) may have read-only access to a virtual machine (e.g., the computing object 310-*c*) but read-write access to a MSSQL database (e.g., the computing object 310-*d*).

Techniques, systems, and devices described herein provide for the DMS 110 to determine whether a user has permission to access report data for a given computing object 310 based on the tenant 305 associated with a given log-in session by the user. The user may log in to establish a session with the DMS 110. During the session, the user (e.g., an administrator for a given tenant 305, or some other user of the tenant 305) may request to access report data for a first set of one or more computing objects 310. In response to the request, the DMS 110 may determine an ID of the user and an ID of the tenant 305 to which the user is logged in based on context information associated with the user's log-in session via which the request is sent. The tenant 305 may have access to (e.g., permission or authorization to access) a second set of computing objects 310 within the object hierarchy. The DMS 110 may filter through the first set of computing objects 310 associated with the requested report data by filtering out or omitting computing objects 310 that are not in the second set of computing objects 310 to which the tenant 305 has access. The DMS 110 may determine that the user has permission to access the requested report data for the remaining computing objects 310 that are included in the second set of computing objects 310 (e.g., are assigned to or accessible by the tenant) and may output such report data to the user accordingly.

For example, if the user is logged in to the tenant 305-*a* (Tenant 1), the second set of computing objects 310 to which the tenant 305-*a* has access within the computing object hierarchy 300 may include the computing objects 310-*b*, 310-*c*, 310-*d*, 310-*g*, 310-*i*, 310-*j*, and 310-*k*. If the user requests to access report data for a first set of computing objects 310 including computing objects 310-*a*, 310-*b*, 310-*c*, 310-*d*, 310-*e*, and 310-*f*, the DMS 110 may determine that the user is authorized to access a subset of the requested report data and the DMS 110 may output the report data associated with the computing objects 310-*b*, 310-*c*, and 310-*d* accordingly.

In some examples, when the DMS 110 generates and stores the report data for a given computing object 310, the DMS 110 may add a field in the report data that indicates an ID of the corresponding computing object 310. The DMS 110 may generate a mapping table for mapping object IDs to corresponding tenants 305 that have access to the objects based on the computing object hierarchy 300. Accordingly, higher-level tenants 305 may be able to request that the DMS 110 display report data that is filtered by subtenants. For example, if a tenant 305 requests to view all report data associated with a first subtenant, the DMS 110 may scan the mapping table using a tenant ID of the first subtenant to determine computing object IDs of computing objects 310 that the first subtenant has access to in the computing object hierarchy. The DMS 110 may filter through a database of report data stored at the DMS 110 using the identified computing object IDs. The DMS 110 may output, to a user of the tenant 305 that requested the report data for the first subtenant, all of the report data that includes the computing object IDs. The described techniques may thereby provide for the DMS 110 to retrieve and provide report data with improved reliability, security, and efficiency.

Figure 4:
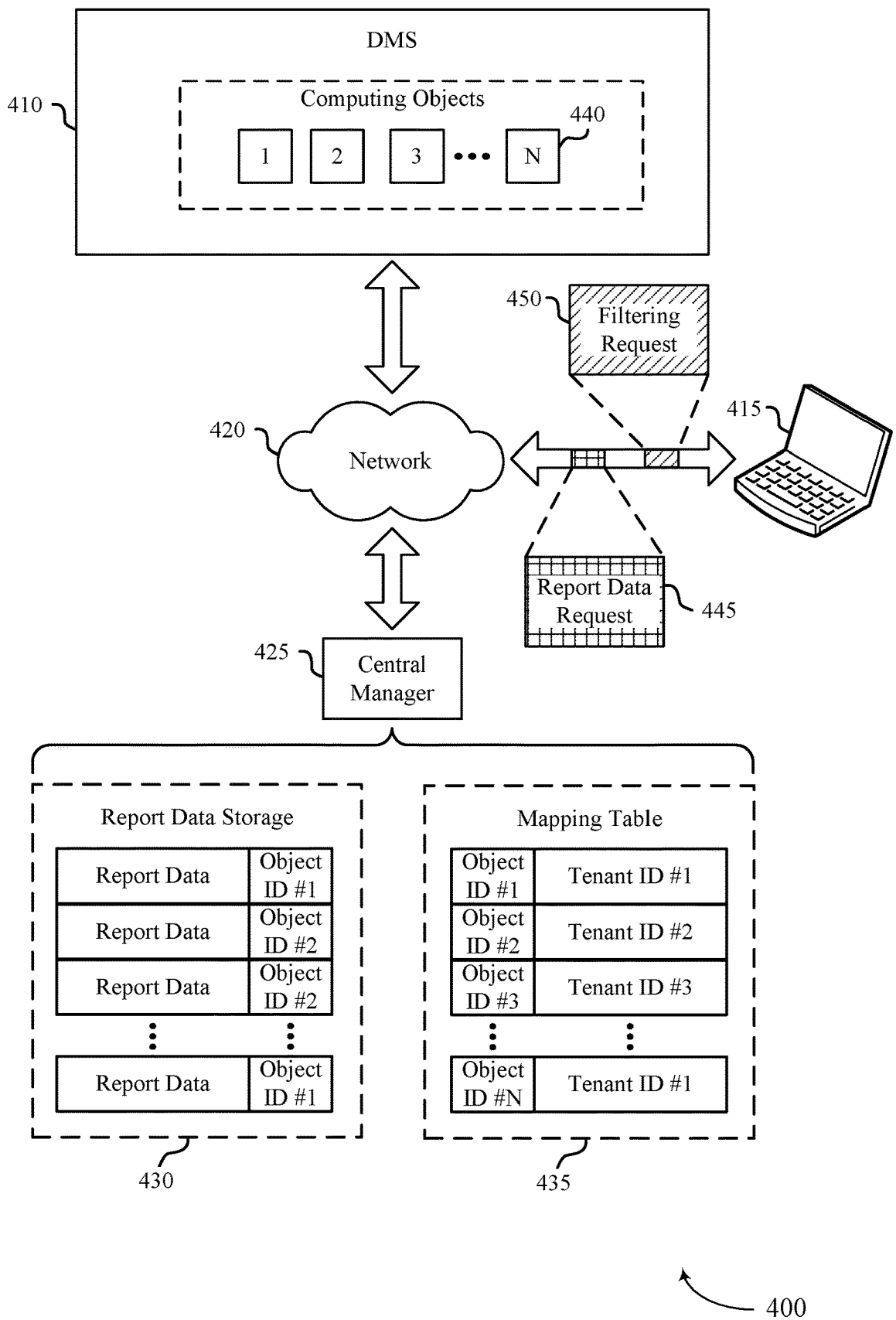
FIG. 4 illustrates an example of a computing environment that supports access authorization for report data in a multi-tenancy DMS in accordance with aspects of the present disclosure.

FIG. 4 illustrates an example of a computing environment 400 that supports access authorization for report data in a multi-tenancy DMS in accordance with aspects of the present disclosure. The computing environment 400 may implement or be implemented by aspects of the computing environment 100, the multi-tenancy system 200, and the computing object hierarchy 300 described with reference to FIGS. 1-3. For example, the computing environment 400 includes a DMS 410 and a computing device 415, which may be in communication with one another via a network 420, as described with reference to FIG. 1. The DMS 410 may provide backup services for multiple tenants (e.g., organizations or business units). The tenants of the DMS 410 may be organized in a hierarchical structure, as described with reference to FIG. 2. In this example, the DMS 410 may determine whether a user has permission to access report data for a given computing object 440 based on a tenant associated with a log-in session by the user.

The DMS 410 may provide backup services for data sources of multiple tenants. The data sources that are to be backed up may be stored within one or more computing systems 105 (not pictured in FIG. 4). The DMS 410 may include or be coupled with a central manager 425. The central manager 425 may be a component of the DMS 410 that manages or facilitates tasks performed by the DMS 410. In this example, the central manager 425 may manage access authorization and filtering for report data in a multi-tenancy system.

The DMS 410 may include multiple computing objects 440 (e.g., N computing objects 440), which may be resources or other entities within the DMS 410. In some examples, the DMS 410 may include one or more clusters (e.g., storage clusters or storage nodes), and the computing objects 440 may represent examples of a cluster or a portion of a cluster of the DMS 410, as described in further detail elsewhere herein, including with reference to FIG. 3. The computing objects 440 may be, for example, virtual machines, folders, filesets, databases, other computing objects, or any combination thereof. Each computing object 440 of the DMS 410 may be associated with or identified by a respective object ID (e.g., a unique ID). The computing objects 440 may be stored at the DMS 410, at the central manager 425, at one or more other servers or databases associated with or coupled to the DMS 410, or any combination thereof.

The DMS 410 may obtain report data for the computing objects 440. The report data may be general information (e.g., application-related information) related to the computing objects 440, such as a backup status of a computing object 440, a status of a task (e.g., a protection task report related to all protection tasks performed for a computing object 440, or some other type of task) or job performed on the computing object 440 (e.g., a time until completion of the task, a starting time of the task, a success or failure of the task, or any combination thereof), a compliance status of a computing object 440 (e.g., whether the computing object is complying with or following a service level agreement domain), a size of the computing object 440 (e.g., an object capacity, a logical size, other size information, or any combination thereof), or any combination thereof. The DMS 410 may generate the report data and store the report data in a report data storage 430) (e.g., a database or other storage location at the DMS 410, at the central manager 425, at one or more other storage locations, or any combination thereof). A client of the DMS 410 may access a report page of a user interface to view the report data for computing objects 440 of the client.

As described herein, when the DMS 410 generates report data for a given computing object 440, the DMS 410 may determine an object ID of the corresponding computing object. The DMS 410 may store the object ID with the report data in the report data storage 430. For example, each section or portion of report data (e.g., report data for each generated report) may be indexed by a respective object ID associated with a computing object 440 on which the report was performed. By storing the object ID with the report data in the report data storage 430, the DMS 410 may efficiently and reliably determine which computing object 440 is associated with the report data, which may improve security and reduce latency associated with backup and management of data by the DMS 410.

In some examples, the DMS 410 may store the report data in a table format in the report data storage 430. For example, the DMS 410 may store the report data in one or more rows, where each row may include a respective type or portion of report data for a respective computing object 440. In some examples, multiple rows of report data may be stored for a same computing object 440 if, for example, the report data includes a relatively large quantity of information, or the report data includes multiple types of report data (e.g., a size of the computing object 440 and a compliance status of the computing object 440, or other types of report data). In the example illustrated in FIG. 4, a first row of the report data storage 430 may include report data associated with a first computing object 440 having an object ID #1. A second row and a third row may include report data associated with a second computing object 440 having an object ID #2. The report data in the second row may, for example, indicate a size of the second computing object 440 at a given time, and the report data in the third row may, for example, indicate a status of a task performed on the computing object 440 at a given time, or some other type of report data. Other rows of report data may include other report data for the first and second computing objects 440 or other computing objects 440 of the DMS 410.

In some examples, a user of the DMS 410 may request to view report data for one or more computing objects 440. The user may be logged in to the DMS 410 via a tenant of the multiple tenants supported by the DMS 410. For example, the user may be an administrator or other user of a tenant. As part of the log-in session with the DMS 410, the user may output (e.g., send, transmit) a report data request 445 to the DMS 410. The user may utilize a computing device 415 to log in to the DMS 410 and access a user interface that displays account settings and information associated with the user's log-in session. The user may send the report data request 445 via the user interface and the network 420 to the DMS 410. The report data request 445 may indicate a request for the user to view or access report data and may indicate one or more computing objects associated with the requested report data. For example, the user may request to view a compliance status or size associated with one or more of the computing objects 440 of the DMS 410 that pertain to the users' data.

Techniques, systems, and devices described herein provide for the DMS 410 to determine whether the user that sends the report data request 445 has permission to access the report data for the requested computing object(s) 440) based on a tenant associated with the log-in session by the user. In response to receiving the report data request 445, the DMS 410 may determine an ID of the user and an ID of the tenant to which the user is logged in based on context information for the log-in session of the user via which the report data request 445 is sent. The context information may include information that defines or identifies the log-in session of the user, including the user ID, the tenant ID, other context information, or any combination thereof.

After determining the tenant ID associated with the report data request 445, the DMS 410 (e.g., the central manager 425) may apply a filter to the one or more computing objects 440 indicated via the report data request 445. The DMS 410 may filter through the one or more computing objects 440 associated with the report data request 445 by filtering out or omitting computing objects 440 that the tenant does not have access to in a computing object hierarchy of the DMS 410 (such as the computing object hierarchy 300 described with reference to FIG. 3).

As described with reference to FIG. 3, the computing objects 440 of the DMS 410 may be organized as part of an object hierarchy, and if a tenant is granted access to one computing object 440 within the object hierarchy, the tenant automatically also has access to any other computing object 440 that is below that computing object 440 within the object hierarchy. Accordingly, the DMS 410 may scan the object hierarchy using the tenant ID associated with the report data request 445 to determine which node (e.g., computing object 440) the tenant has authorization or permission to access. The DMS 410 may determine that the node and all computing objects 440 below the node in the object hierarchy are included in a set of one or more computing objects 440 to which the tenant has access. When applying the filter to the one or more computing objects 440 associated with the report data request 445, the DMS 410 may determine which of the requested computing objects 440 are included in the set of one or more computing objects 440 to which the tenant has access. In some examples, the DMS 410 may compare object IDs of the computing objects 440, and the DMS 410 may filter out or omit any computing objects 440 indicated via the report data request 445 that have object IDs that do no match any object IDs of the set of one or more computing objects 440 to which the tenant has access.

After filtering out any computing objects 440 to which the tenant does not have access, the DMS 410 may determine that remaining computing objects 440 indicated via the report data request 445 are accessible by the tenant. That is, the DMS 410 may determine that the user has permission to access the requested report data for the remaining computing objects 440 that are indicated via the report data request 445 and are included in the set of one or more computing objects 440 to which the tenant has access in the object hierarchy. The DMS 410 may output the report data for such computing objects 440 to the user. For example, the DMS 410 may output the computing objects 440 or access to the computing objects (e.g., the DMS 410 may export or mount the computing objects 440) to the computing device 415 (e.g., as part of the user interface) via the network 420. The DMS 410 may similarly verify authorization for any report data request 445 received from any other user of the DMS 410, which may improve security and reliability of the services performed by the DMS 410.

In some examples, a user of the DMS 410 may request to filter report data by one or more parameters, such as object size, compliance status, computing object 440, tenant, or some other filtering criteria. As described herein, the DMS 410 may use the object IDs stored in the report data storage 430 to support filtering the report data in the report data storage 430 (e.g., a database of report data) per computing object 440 or per tenant. In some examples, a user of a relatively high level tenant (e.g., an administrator of a global organization, MSP, or other tenant that has authorization over at least one subtenant) may request to view report data for one or more subtenants. After establishing or initiating a log-in session with the DMS 410 via the tenant, the user may access a user interface via the computing device 415. The user may perform a search or other request in the user interface to view report data for one or more subtenants. The DMS 410 may receive the filtering request 450 via the network 420. The filtering request 450 may indicate an ID of the subtenant(s) for which the user requests to view report data.

In response to receiving the filtering request 450 to view report data for a given subtenant, the DMS 410 may filter the report data in the report data storage 430 per tenant. As described herein, the DMS 410 may utilize a mapping table 435 to perform the filtering of report data per tenant. The mapping table 435 may represent a database of information stored at the DMS 410, the central manager 425, or some other storage location included in or coupled with the DMS 410. The mapping table 435 may include mapping information for the computing objects 440 of the DMS 410. The mapping information for a given computing object 440 may be stored in a row of the mapping table 435. That is, each row of the mapping table 435 may be associated with a respective computing object 440 and may be indexed by a respective object ID. The mapping information in each row may include the object ID and one or more tenant IDs of tenants that have access to the object ID in the object hierarchy of the DMS 410.

In the example illustrated in FIG. 4, the mapping table 435 may include N rows indexed by object IDs #1. #2, #3, through #N. A first row for the object ID #1 may include a first tenant ID #1 and may indicate a first tenant having the tenant ID #1 has access to the computing object 440 with object ID #1 in the object hierarchy. The same tenant may also have access to a computing object 440 with object ID #N, as shown by a final row in the mapping table 435 (e.g., the object IDs #1 and #N may be under a same node in the object hierarchy, and the tenant may have access to that node). A second tenant with tenant ID #2 may have access to a second computing object 440 with object ID #2 and a third tenant with tenant ID #3 may have access to a third computing object 440 with object ID #3. Although a single tenant ID is shown in each row of the mapping table 435 illustrated in FIG. 4, it is to be understood that one or more tenant IDs may be included in each row, because a single computing object 440) may be assigned to one or more tenants, in some examples.

The DMS 410 (e.g., the central manager 425 or some other component of the DMS 410) may update the mapping table 435 dynamically based on the computing object hierarchy and tenant access grants. In some examples, a backend job (referred to as a mapping job in some examples herein) may be executed to maintain the mapping table 435. Generating and updating the mapping information in the mapping table 435 may be referred to as flattening the computing object hierarchy, in some examples. For example, the mapping job may be operable to review tenant assignments in the computing object hierarchy (e.g., which tenant is assigned to which node in the object hierarchy) and generate mapping information that flattens the tenant assignments. The mapping job may be executed periodically or according to a schedule and may scan the object hierarchy to determine if any tenant assignments are changed or newly created. If a tenant was previously assigned to a first node, and the tenant assignment changed so the tenant is no longer assigned to a node, the mapping job may, for example, remove the tenant ID from the mapping table 435. If a tenant is assigned to a new node in the object hierarchy, the mapping job may determine a set of computing objects 440) that are below the node and include the node, and the mapping job may update the mapping table 435 to include the tenant ID in each row of the mapping table that is indexed by an object ID of a computing object 440 of the set of computing objects 440. The DMS 410 may thereby execute one or more mapping jobs to generate and maintain the mapping table 435, which may assist with filtering report data per tenant.

To filter the data per tenant in response to the filtering request 450, the DMS 410 may scan the mapping table 435 using the tenant ID of the subtenant(s) indicated via the filtering request 450. The DMS 410 may identify or select a set of computing object IDs from among all of the computing object IDs in the mapping table 435 based on the mapping information for the set of computing object IDs including the tenant ID of the subtenant. For example, if the filtering request 450 requests to view report data for a first subtenant having the tenant ID #1, the DMS 410 may scan the mapping table 435 using the tenant ID #1. The DMS 410 may determine a set of computing object IDs, such as the object IDs #1 and #N, that correspond to mapping information including the tenant ID #1 in the mapping table 435.

The DMS 410 may subsequently identify report data in the report data storage 430 (e.g., report data that has been previously obtained and stored by the DMS 410) that includes the set of object IDs selected from the mapping table 435. For example, if the DMS 410 determined, based on scanning the mapping table 435, that the object IDs #1 and #N are assigned to the subtenant, the DMS 410 may scan the report data storage 430 to find any report data that includes the object IDs #1 and #N. The DMS 410 may determine that the identified report data includes all of the report data for the requested subtenant. The DMS 410 may output (e.g., transmit, send, export, or mount), the identified report data for the subtenant to the user via the user interface in response to the filtering request 450. In some examples, the DMS 410 may display the report data in a list or other organized format. By storing object IDs with report data and maintaining a mapping table 435, the DMS 410 may thereby provide filtered report data to a user of the DMS 410.

In some examples, the DMS 410 may verify authorization of the user to access the report data before outputting the filtered report data. For example, the DMS 410 may use the tenant ID of the tenant associated with the user to determine whether the tenant is authorized to access the subtenant and corresponding computing objects in the hierarchy. If the tenant is not authorized to access the computing objects, the subtenant, or both, the DMS 410 may refrain from outputting the filtered report data to the user. If the tenant is authorized to access the computing objects and the subtenant, the DMS 410 may output the filtered report data to the user.

The DMS 410 described herein may thereby obtain and store report data for multiple computing objects 440 of the DMS 410 while managing client data for multiple tenants. By using the described techniques for authorizing access to report data and filtering report data, the DMS 410 may support efficient, secure, and reliable management of report data in a multi-tenant system.

Figure 5:
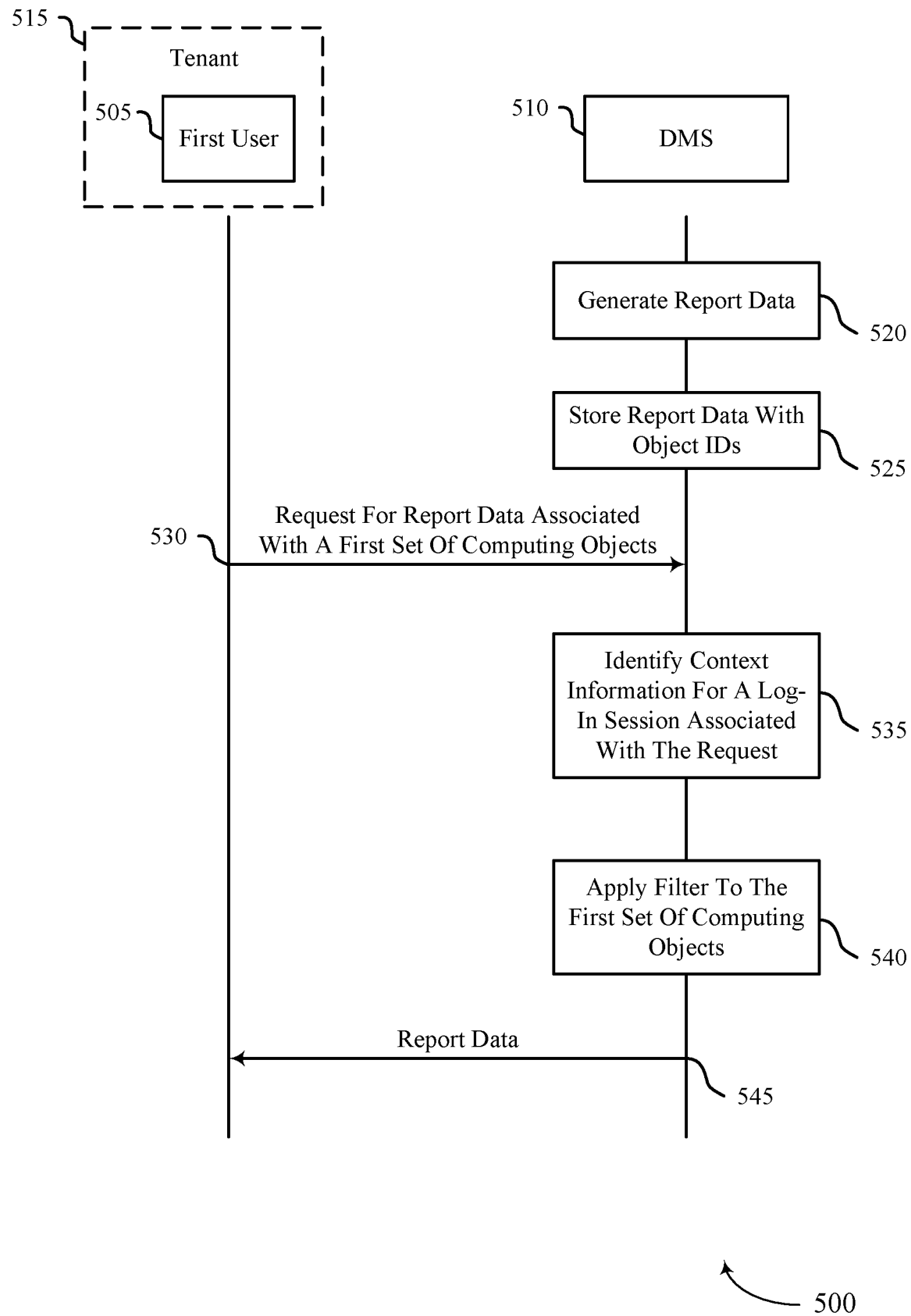
FIG. 5 illustrates an example of a process flow that supports access authorization for report data in a multi-tenancy DMS in accordance with aspects of the present disclosure.

FIG. 5 illustrates an example of a process flow 500 that supports access authorization for report data in a multi-tenancy DMS in accordance with aspects of the present disclosure. The process flow 500 may implement or be implemented by aspects of the computing environments 100 and 400, the multi-tenancy system 200, and the computing object hierarchy 300, as described with reference to FIGS. 1-4. For example, the process flow 500 may be implemented by a user 505, which may be logged in to a tenant 515 (e.g., an administrator for the tenant 515, or some other user 505 of the tenant 515) and one or more components of a DMS 510, which may represent examples of corresponding devices and components as described with reference to FIGS. 1-4. In some examples, the user 505 may represent an example of a computing device that may communicate with the DMS 510 via a user interface, such as the computing devices 115 or 415 described with reference to FIGS. 1 and 2. In this example, the DMS 510 may determine whether the user 505 has permission to access report data for a given computing object based on the tenant 515 associated with a log-in session of the user 505.

In some aspects, the operations illustrated in the process flow 500 may be performed by hardware (e.g., including circuitry, processing blocks, logic components, and other components), code (e.g., software or firmware) executed by a processor, or any combination thereof. For example, aspects of the process flow 500 may be implemented or managed by a DMS, a report data access component, or some other software or application within a DMS 510 that is configured to manage backup and restoration of data and other computing resources for multiple tenants.

Although the user 505 and the DMS 510 are illustrated in FIG. 5, it is to be understood that the process to authorize access for report data in a multi-tenancy system as described herein may be performed by any one or more components of a DMS 510, including components not shown in FIG. 5. For example, the DMS 510 may include or be coupled with a central manager, one or more other components, or any combination thereof (not pictured in FIG. 5) that may be configured to facilitate or manage any one or more of the processes illustrated in FIG. 5. Additionally, or alternatively, one or more components may perform tasks or may be configured to function in a different manner than illustrated in FIG. 5. Alternative examples of the following may be implemented, where some steps are performed in a different order than described or are not performed at all. In some cases, steps may include additional features not mentioned below, further steps may be added, or different components may perform the steps.

At 520, in some examples, the DMS 510 may generate report data for one or more computing objects. The DMS 510 may generate the report data periodically, at one or more scheduled time instances, or dynamically based on one or more conditions or triggers associated with the computing objects. The report data for a given computing object may include a compliance status of the computing object, a size of the computing object, a status of one or more tasks being performed using or on the computing object, one or more other types of data associated with the computing object, or any combination thereof.

At 525, in some examples, the DMS 510 may store the report data for the one or more computing objects based on generating the report data. The DMS 510 may store, with the report data, one or more object IDs for the one or more computing objects. For example, the DMS 510 may store a respective object ID for each portion of report data, as described in further detail elsewhere herein, including with reference to FIG. 4. The DMS 510 may store the report data and one or more object IDs at the DMS 510 (e.g., in a report data database or storage location) or in some other storage location associated with the DMS 510.

At 530, the user 505 may send (e.g., output, transmit) a request, to the DMS 510 via a user interface, to access report data associated with a first set of one or more computing objects. The first set of one or more computing objects may include some or all of multiple computing objects of the DMS 510. The computing objects of the DMS 510 may represent examples of resources or other entities within the DMS 510 (e.g., clusters or portions of clusters) and may be organized into a hierarchy of computing objects, as described in further detail elsewhere herein, including with reference to FIG. 3.

At 535, the DMS 510 may identify context information for a log-in session associated with the request to access the report data. For example, the user 505 may log in to the DMS 510 to initiate the log-in session. The user 505 may transmit the request as part of the log-in session. The user 505 may log in to the DMS 510 as a user 505 of the tenant 515 (e.g., an administrator or other user 505 of the tenant 515). The context information for the log-in session may include a tenant ID of the tenant 515. The Tenant ID may identify or distinguish the tenant 515 from among multiple tenants of the multi-tenancy DMS 510.

At 540, the DMS 510 may apply a filter to the first set of one or more computing objects associated with the requested report data. The DMS 510 may access the requested report data in a report data storage location of the DMS 510 in response to the request. The DMS 510 may identify one or more object IDs that are stored in or included in the requested report data. The one or more object IDs may identify the first set of one or more computing objects. The filter may be based on a second set of one or more computing objects to which the tenant 515 associated with the request (e.g., the tenant 515 to which the user 505 is logged in) has access within the hierarchy of computing objects. For example, filtering the first set of one or more computing objects may include the DMS 510 determining whether each computing object ID of the one or more computing object IDs for the first set of one or more computing objects associated with the requested report data matches a computing object ID of the second set of one or more computing objects to which the tenant 515 has access.

At 545, the DMS 510 may output (e.g., send, transmit), in response to applying the filter, the report data for at least one computing object of the first set of one or more computing objects. The DMS 510 may output the at least one computing object based on that computing object being included in the second set of computing objects (e.g., an object ID of the at least one computing object matches an object ID of at least one second computing object of the second set). In some examples, the DMS may output all of the first set of one or more computing objects if all of the first set of one or more computing objects are included in the second set of one or more computing objects (e.g., if the tenant 515 has access to all of the first set of one or more computing objects). Additionally, or alternatively, the DMS 510 may output a subset of one or more computing objects that the tenant 515 has access to.

In some examples, the DMS 510 may refrain from outputting second report data for a second computing object of the first set of one or more computing objects based on the second computing object being absent from (e.g., not included in or excluded from) the second set of one or more computing objects. For example, if the DMS 510 determines that an object ID of the second computing object does not match or is not the same as an object ID of any of the second set of one or more computing objects, the DMS 510 may refrain from outputting report data for the second computing object to the first user 505 because the first user 505 may not be authorized to access the report data.

The DMS 510 may thereby facilitate secure and reliable exchanges of report data with customers or users 505 of the DMS 510. The DMS 510 may use context information associated with a log-in session of a user 505 to determine a tenant 515 to which the user 505 is logged in. The DMS 510 may use a tenant ID of the tenant 515 to determine whether the tenant 515 is authorized or permitted to access the computing objects associated with requested report data. The DMS 510 may thereby support multiple tenants while maintaining reliable and secure data management services for each tenant 515 separately.

Figure 6:
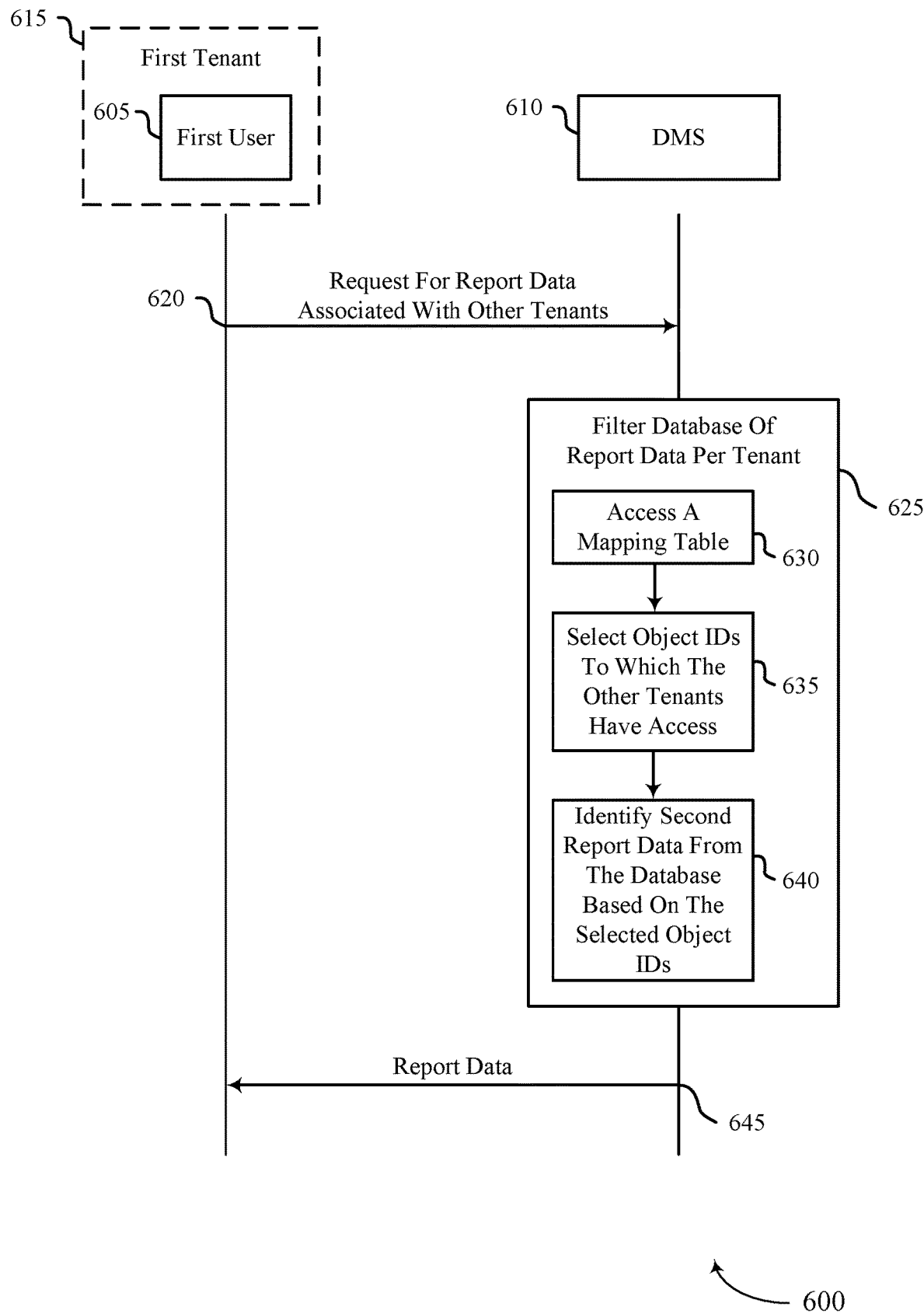
FIG. 6 illustrates an example of a process flow that supports access authorization for report data in a multi-tenancy DMS in accordance with aspects of the present disclosure.

FIG. 6 illustrates an example of a process flow 600 that supports access authorization for report data in a multi-tenancy DMS in accordance with aspects of the present disclosure. The process flow 600 may implement or be implemented by aspects of the computing environments 100 and 400, the multi-tenancy system 200, the computing object hierarchy 300, and the process flow 500, as described with reference to FIGS. 1-5. For example, the process flow 600 may be implemented by a user 605, which may be logged in to a first tenant 615 (e.g., an administrator for the first tenant 615, or some other user 605 of the first tenant 615) and one or more components of a DMS 610, which may represent examples of corresponding devices and components as described with reference to FIGS. 1-5. In some examples, the user 605 may represent an example of a computing device that may communicate with the DMS 610 via a user interface, such as the computing devices 115 or 415 described with reference to FIGS. 1 and 2. In this example, the DMS may generate and store report data for computing objects associated with multiple tenants, and the user 605 may request the DMS 610 to filter report data per tenant.

In some aspects, the operations illustrated in the process flow 600 may be performed by hardware (e.g., including circuitry, processing blocks, logic components, and other components), code (e.g., software or firmware) executed by a processor, or any combination thereof. For example, aspects of the process flow 600 may be implemented or managed by a DMS 610, a report data access component, or some other software or application within a DMS 610 that is configured to manage backup and restoration of data and other computing resources for multiple tenants.

Although the user 605 and the DMS 610 are illustrated in FIG. 6, it is to be understood that the process to authorize access for report data in a multi-tenancy system as described herein may be performed by any one or more components of a DMS 610, including components not shown in FIG. 6. For example, the DMS 610 may include or be coupled with a central manager, one or more other components, or any combination thereof (not pictured in FIG. 6) that may be configured to facilitate or manage any one or more of the processes illustrated in FIG. 6. Additionally, or alternatively, one or more components may perform tasks or may be configured to function in a different manner than illustrated in FIG. 6. Alternative examples of the following may be implemented, where some steps are performed in a different order than described or are not performed at all. In some cases, steps may include additional features not mentioned below, further steps may be added, or different components may perform the steps.

At 620, the user 605 may output (e.g., transmit, send) a request to view report data associated with one or more other tenants of multiple tenants supported by the DMS 610 (not pictured in FIG. 6). For example, the user 605 may be an administrator or some other user 605 of the first tenant 615, and the first tenant 615 may be a higher level tenant within a hierarchy of the multiple tenants supported by the DMS 610 (e.g., a global organization, an MSP, or some other higher level tenant). The one or more other tenants may be subtenants of the first tenant 615. In some examples, the user 605 may request to view all report data previously obtained by and stored by the DMS 610 that relates to any combination of one or more tenants that are assigned to or below the first tenant 615 in the tenant hierarchy. In some examples, the user 605 may access a user interface of the DMS 610 and perform a search within the user interface. If the user 605 searches for a given organization or subtenant, the search may correspond to or trigger the request for report data associated with the given organization or subtenant. For example, the user 605 may request to view a display on the user interface of the report data for the given subtenant.

At 625, the DMS 610 may filter a database of report data stored by the DMS 610. The DMS 610 may filter the report data per tenant and in response to the request from the user 605, one or more other requests from other users of the DMS 610, or any combination thereof.

As part of filtering the database of report data for the second tenant in response to the request, at 630, the DMS 610 may access a mapping table that includes mapping information for the computing objects of the DMS 610. The mapping information for a given computing object may map that computing object to at least one tenant that has access to the computing object in the hierarchy of computing objects. The mapping table may represent an example of the mapping table 435, as described with reference to FIG. 4. At 435, the DMS may select, from among all of the computing objects of the DMS 610 based on accessing the mapping table, one or more object IDs for a third set of one or more computing objects to which the one or more other tenants have access within the hierarchy of computing objects. For example, the DMS 610 may scan the mapping table to identify rows that include the tenant IDs of the one or more other tenants. Each row of the mapping table may be indexed by a respective object ID, and the DMS 610 may select the object IDs of each row that includes the tenant IDs of the one or more other tenants. That is, mapping information for the third set of one or more computing objects in the mapping table may include the tenant IDs of the one or more other tenants.

At 640, as part of filtering the database of report data for the one or more other tenants, the DMS 610 may identify second report data that is stored within the database of report data generated by the DMS 610 based on the selected object IDs of the third set of one or more computing objects. For example, the report data in the database at the DMS 610 may be stored with respective object IDs. The DMS 610 may scan the report data database to identify report data that includes the object IDs associated with the third set of one or more computing objects. The identified report data may include all of the report data associated with the one or more other tenants. Thus, the DMS 610 may filter out the report data associated with the one or more other tenants from among the database of report data in response to the request. The DMS 610 may similarly filter out report data for any other tenant or combination of one or more tenants of the DMS 610.

At 645, after filtering the report data for the one or more other tenants from among the database of report data at the DMS 610, the DMS may output (e.g., transmit, send), to the user 605 and in response to the request, the report data associated with the one or more other tenants based on the filtering. In some examples, the DMS 610 may display the report data for the one or more other tenants as a list or set via a user interface. In some examples, before outputting the report data, the DMS 610 may determine whether the user 605 is authorized to access the requested report data based on an ID of the first tenant 615 to which the user 605 is logged in, as described in further detail elsewhere herein, including with reference to FIG. 5.

By storing object IDs with corresponding report data, the DMS 610 may thereby support filtering report data per tenant as described herein. The described techniques may improve security, reliability, and customer satisfaction with the multi-tenancy DMS 610.

Figure 7:
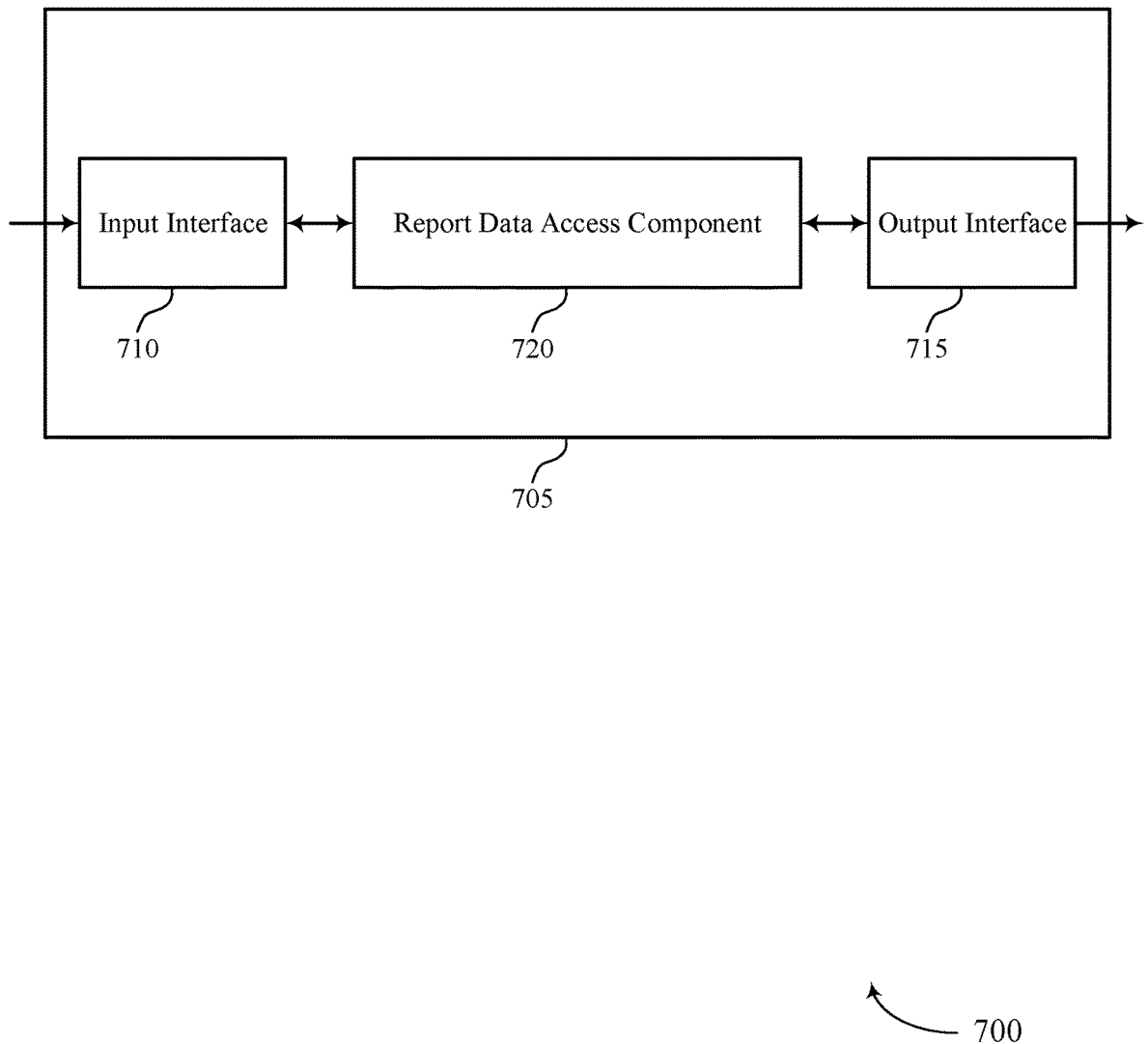
FIGS. 7 and 8 illustrate block diagrams of devices that support access authorization for report data in a multi-tenancy DMS in accordance with aspects of the present disclosure.

FIG. 7 illustrates a block diagram 700 of a system 705 that supports access authorization for report data in a multi-tenancy DMS in accordance with aspects of the present disclosure. The system 705 may be an example of aspects of a DMS as described herein. The system 705 may include an input interface 710, an output interface 715, and a report data access component 720. The system 705 may also include a processor. Each of these components may be in communication with one another (e.g., via one or more buses).

The input interface 710 may manage input signaling for the system 705. For example, the input interface 710 may receive input signaling (e.g., messages, packets, data, instructions, commands, or any other form of encoded information) from other systems or devices. The input interface 710 may send signaling corresponding to (e.g., representative of or otherwise based on) such input signaling to other components of the system 705 for processing. For example, the input interface 710 may transmit such corresponding signaling to the report data access component 720 to support access authorization for report data in a multi-tenancy DMS. In some cases, the input interface 710 may be a component of a network interface 1025 as described with reference to FIG. 10.

The output interface 715 may manage output signaling for the system 705. For example, the output interface 715 may receive signaling from other components of the system 705, such as the report data access component 720, and may transmit such output signaling corresponding to (e.g., representative of or otherwise based on) such signaling to other systems or devices. In some cases, the output interface 715 may be a component of a network interface 1025 as described with reference to FIG. 10.

The report data access component 720, the input interface 710, the output interface 715, or various combinations thereof or various components thereof may be examples of means for performing various aspects of access authorization for report data in a multi-tenancy DMS as described herein. For example, the report data access component 720, the input interface 710, the output interface 715, or various combinations or components thereof may support a method for performing one or more of the functions described herein.

In some examples, the report data access component 720, the input interface 710, the output interface 715, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the report data access component 720, the input interface 710, the output interface 715, or various combinations or components thereof may be implemented in code (e.g., as communications management software or firmware) executed by a processor. If implemented in code executed by a processor, the functions of the report data access component 720, the input interface 710, the output interface 715, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the report data access component 720 may be configured to perform various operations (e.g., receiving, monitoring, transmitting) using or otherwise in cooperation with the input interface 710, the output interface 715, or both. For example, the report data access component 720 may receive information from the input interface 710, send information to the output interface 715, or be integrated in combination with the input interface 710, the output interface 715, or both to receive information, transmit information, or perform various other operations as described herein.

For example, the report data access component 720 may be configured as or otherwise support a means for receiving, by a DMS, a request for report data associated with a first set of one or more computing objects of the DMS, where the DMS is operable to provide protection for data sources associated with a set of multiple tenants of the DMS, and where computing objects of the DMS are organized as a hierarchy of computing objects. The report data access component 720 may be configured as or otherwise support a means for identifying context information for a log-in session associated with the request to access the report data, where the context information for the log-in session includes a tenant ID for a tenant associated with the request, the tenant included in the set of multiple tenants. The report data access component 720 may be configured as or otherwise support a means for applying a filter to the first set of one or more computing objects associated with the requested report data, where the filter is based on a second set of one or more computing objects to which the tenant associated with the request has access within the hierarchy of computing objects. The report data access component 720 may be configured as or otherwise support a means for outputting, in response to applying the filter, the report data for at least one computing object of the first set of one or more computing objects based on the at least one computing object being included in the second set of one or more computing objects.

By including or configuring the report data access component 720 in accordance with examples as described herein, the system 705 (e.g., a processor controlling or otherwise coupled with the input interface 710, the output interface 715, the report data access component 720, or a combination thereof) may support techniques for improved data management reliability, improved DMS performance and compliance for applications and systems that use objects managed by the system 705, reduced power consumption, reduced processing complexity.

Figure 8:
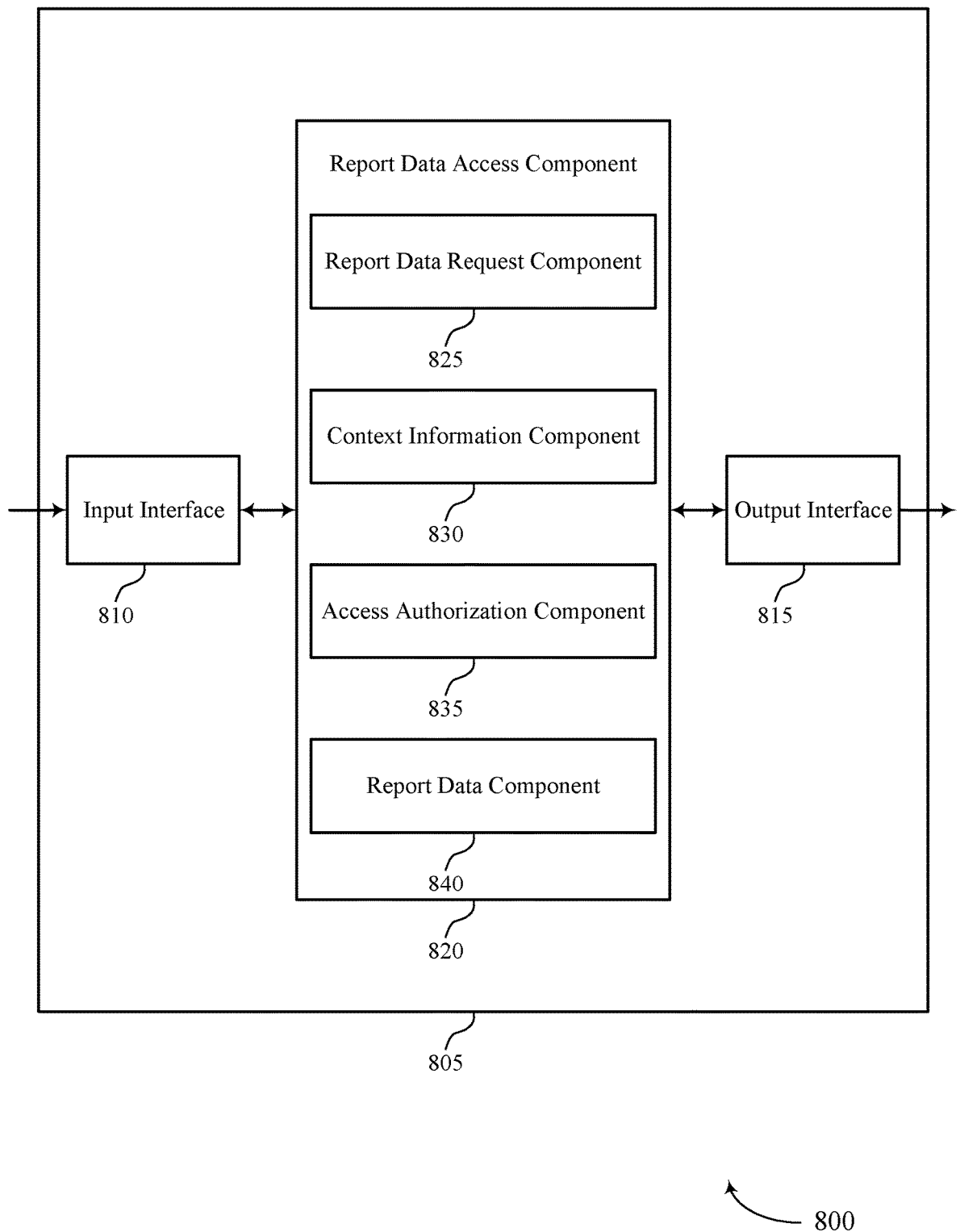

FIG. 8 illustrates a block diagram 800 of a system 805 that supports access authorization for report data in a multi-tenancy DMS in accordance with aspects of the present disclosure. In some examples, the system 805 may be an example of aspects of one or more components described with reference to FIG. 1, such as a DMS 110. The system 805 may be an example of aspects of a system 705 or a DMS 110 as described herein. The system 805 may include an input interface 810, an output interface 815, and a report data access component 820. The system 805 may also include one or more processors. Each of these components may be in communication with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the report data access component 820 to support access authorization for report data in a multi-tenancy DMS. In some cases, the input interface 810 may be a component of a network interface 1025 as described with reference to FIG. 10.

The output interface 815 may manage output signaling for the system 805. For example, the output interface 815 may receive signaling from other components of the system 805, such as the report data access component 820, and may transmit such output signaling corresponding to (e.g., representative of or otherwise based on) such signaling to other systems or devices. In some cases, the output interface 815 may be a component of a network interface 1025 as described with reference to FIG. 10.

The system 805, or various components thereof, may be an example of means for performing various aspects of access authorization for report data in a multi-tenancy DMS as described herein. For example, the report data access component 820 may include a report data request component 825, a context information component 830, an access authorization component 835, a report data component 840, or any combination thereof. The report data access component 820 may be an example of aspects of a report data access component 720 as described herein. In some examples, the report data access component 820, or various components thereof, may be configured to perform various operations (e.g., receiving, monitoring, transmitting) using or otherwise in cooperation with the input interface 810, the output interface 815, or both. For example, the report data access component 820 may receive information from the input interface 810, send information to the output interface 815, or be integrated in combination with the input interface 810, the output interface 815, or both to receive information, transmit information, or perform various other operations as described herein.

The report data request component 825 may be configured as or otherwise support a means for receiving, by a DMS, a request for report data associated with a first set of one or more computing objects of the DMS, where the DMS is operable to provide protection for data sources associated with a set of multiple tenants of the DMS, and where computing objects of the DMS are organized as a hierarchy of computing objects. The context information component 830 may be configured as or otherwise support a means for identifying context information for a log-in session associated with the request to access the report data, where the context information for the log-in session includes a tenant ID for a tenant associated with the request, the tenant included in the set of multiple tenants. The access authorization component 835 may be configured as or otherwise support a means for applying a filter to the first set of one or more computing objects associated with the requested report data, where the filter is based on a second set of one or more computing objects to which the tenant associated with the request has access within the hierarchy of computing objects. The report data component 840 may be configured as or otherwise support a means for outputting, in response to applying the filter, the report data for at least one computing object of the first set of one or more computing objects based on the at least one computing object being included in the second set of one or more computing objects.

Figure 9:
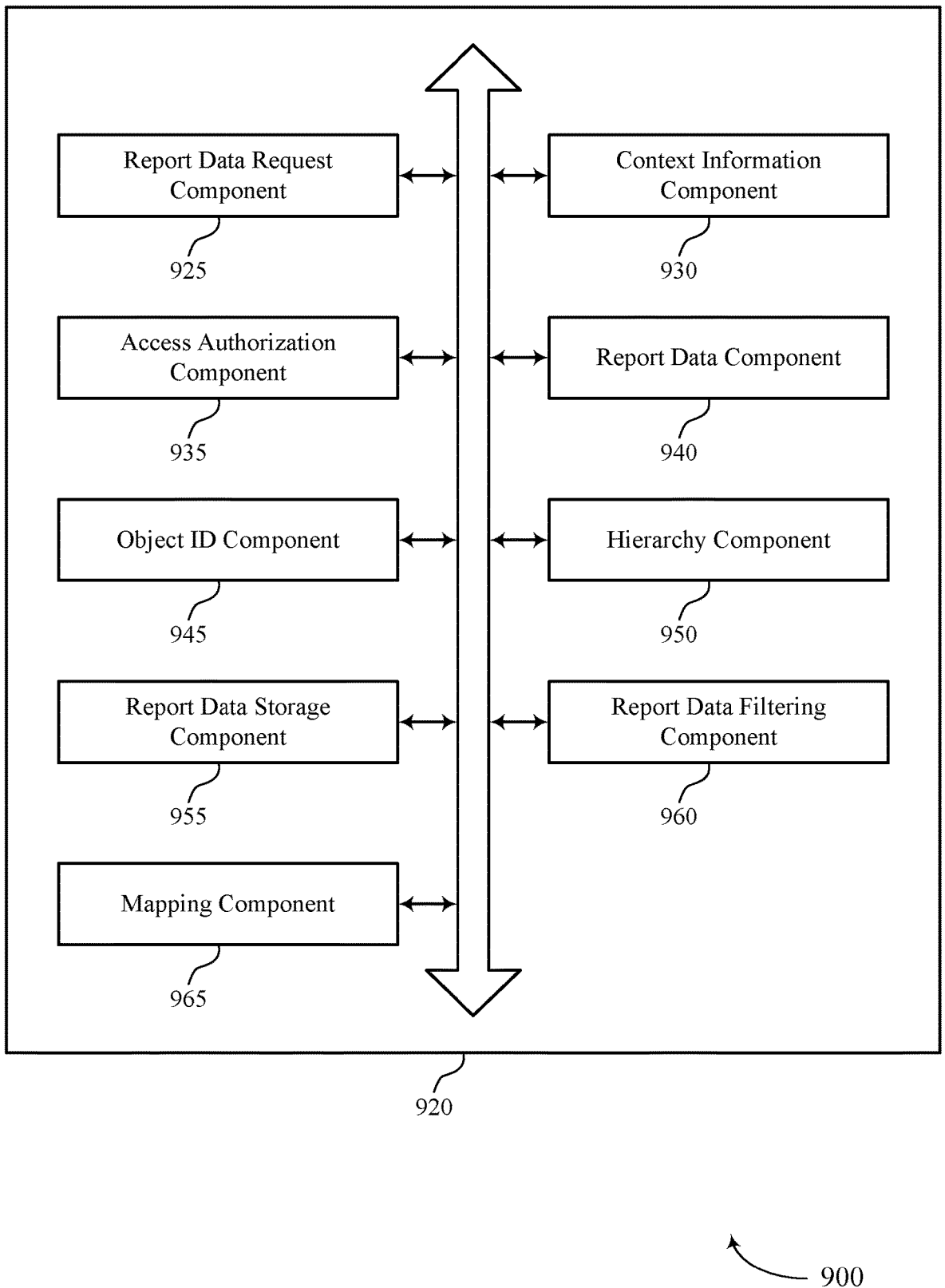
FIG. 9 illustrates a block diagram of a report data access component that supports access authorization for report data in a multi-tenancy DMS in accordance with aspects of the present disclosure.

FIG. 9 illustrates a block diagram 900 of a report data access component 920 that supports access authorization for report data in a multi-tenancy DMS in accordance with aspects of the present disclosure. The report data access component 920 may be an example of aspects of a report data access component 720, a report data access component 820, or both, as described herein. The report data access component 920, or various components thereof, may be an example of means for performing various aspects of access authorization for report data in a multi-tenancy DMS as described herein. For example, the report data access component 920 may include a report data request component 925, a context information component 930, an access authorization component 935, a report data component 940, an object ID component 945, a hierarchy component 950, a report data storage component 955, a report data filtering component 960, a mapping component 965, or any combination thereof. Each of these components may communicate, directly or indirectly, with one another (e.g., via one or more buses, communications links, communications interfaces, or any combination thereof).

The report data request component 925 may be configured as or otherwise support a means for receiving, by a DMS, a request for report data associated with a first set of one or more computing objects of the DMS, where the DMS is operable to provide protection for data sources associated with a set of multiple tenants of the DMS, and where computing objects of the DMS are organized as a hierarchy of computing objects. The context information component 930 may be configured as or otherwise support a means for identifying context information for a log-in session associated with the request to access the report data, where the context information for the log-in session includes a tenant ID for a tenant associated with the request, the tenant included in the set of multiple tenants. The access authorization component 935 may be configured as or otherwise support a means for applying a filter to the first set of one or more computing objects associated with the requested report data, where the filter is based on a second set of one or more computing objects to which the tenant associated with the request has access within the hierarchy of computing objects. The report data component 940 may be configured as or otherwise support a means for outputting, in response to applying the filter, the report data for at least one computing object of the first set of one or more computing objects based on the at least one computing object being included in the second set of one or more computing objects.

In some examples, the object ID component 945 may be configured as or otherwise support a means for identifying, in response to the request, one or more first object IDs for the first set of one or more computing objects, the one or more first object IDs included in the requested report data. In some examples, the hierarchy component 950) may be configured as or otherwise support a means for accessing, based on the tenant ID of the tenant associated with the request, a database including hierarchical information associated with the hierarchy of computing objects. In some examples, the object ID component 945 may be configured as or otherwise support a means for identifying, based on the hierarchical information, one or more second object IDs for the second set of one or more computing objects to which the tenant associated with the request has access within the hierarchy of computing objects. In some examples, to apply the filter, the access authorization component 935 may be configured as or otherwise support a means for determining whether the one or more first object IDs included in the requested report data match the one or more second object IDs for the second set of one or more computing objects to which the tenant associated with the request has access within the hierarchy of computing objects.

In some examples, the hierarchical information includes a set of multiple rows of information. In some examples, a row of the set of multiple rows includes the tenant ID of the tenant associated with the request and further includes the one or more second object IDs for the second set of one or more computing objects to which the tenant has access within the hierarchy of computing objects.

In some examples, the report data component 940 may be configured as or otherwise support a means for generating the report data for the first set of one or more computing objects. In some examples, the report data storage component 955 may be configured as or otherwise support a means for storing, at the DMS based on the generating, the report data for the first set of one or more computing objects and one or more object IDs for the first set of one or more computing objects, where applying the filter is based on the one or more stored object IDs for the first set of one or more computing objects.

In some examples, to support storing the one or more object IDs for the first set of one or more computing objects, the report data storage component 955 may be configured as or otherwise support a means for storing a first object ID for a first computing object of the first set of one or more computing objects in a first field of the report data, where the first field is included in a first row that includes report data associated with the first computing object. In some examples, to support storing the one or more object IDs for the first set of one or more computing objects, the report data storage component 955 may be configured as or otherwise support a means for storing a second object ID for a second computing object of the first set of one or more computing objects in a second field of the report data, where the second field is included in a second row that includes report data associated with the second computing object.

In some examples, the report data request component 925 may be configured as or otherwise support a means for receiving a second request to view second report data associated with one or more other tenants of the set of multiple tenants of the DMS, where the second request is associated with the log-in session and the tenant, and where the one or more other tenants are one or more subtenants of the tenant within a tenant hierarchy associated with the set of multiple tenants. In some examples, the report data filtering component 960 may be configured as or otherwise support a means for filtering, per tenant and in response to the second request, a database of report data stored by the DMS. In some examples, the report data filtering component 960 may be configured as or otherwise support a means for outputting, to a user of the tenant via a user interface and in response to the second request, the second report data associated with the one or more other tenants based on the filtering and the one or more other tenants being one or more subtenants of the tenant within the tenant hierarchy.

In some examples, the mapping component 965 may be configured as or otherwise support a means for accessing, based on the second request, a mapping table that includes mapping information for a set of multiple computing objects of the DMS, where the mapping information for a computing object of the set of multiple computing objects indicates at least one tenant that has access to the computing object within the hierarchy of computing objects. In some examples, the object ID component 945 may be configured as or otherwise support a means for selecting, from among the set of multiple computing objects of the DMS based on accessing the mapping table, one or more object IDs for a third set of one or more computing objects to which the one or more other tenants have access within the hierarchy of computing objects, where selecting the one or more object IDs for the third set of one or more computing objects is based on mapping information for the third set of one of more computing objects in the mapping table including one or more tenant IDs for the one or more other tenants. In some examples, the report data component 940 may be configured as or otherwise support a means for identifying, after selecting the one or more object IDs of the third set of one or more computing objects, the second report data from among the database of report data based on the second report data including the one or more object IDs for the third set of one or more computing objects, where filtering the database of report data for the second tenant is based on the identifying.

In some examples, the hierarchy component 950 may be configured as or otherwise support a means for identifying the third set of one or more computing objects to which the one or more other tenants have access within the hierarchy of computing objects. In some examples, the mapping component 965 may be configured as or otherwise support a means for storing the one or more tenant IDs of the one or more other tenants in a set of one or more rows of the mapping table, the set of one or more rows indexed by the one or more object IDs for the third set of one or more computing objects.

In some examples, the access authorization component 935 may be configured as or otherwise support a means for refraining from outputting second report data for a second computing object of the first set of one or more computing objects based on the second computing object being absent from the second set of one or more computing objects.

In some examples, the report data for the first set of one or more computing objects includes a compliance status, a size, a status of one or more tasks, or any combination thereof associated with at the least one computing object of the first set of one or more computing objects.

Figure 10:
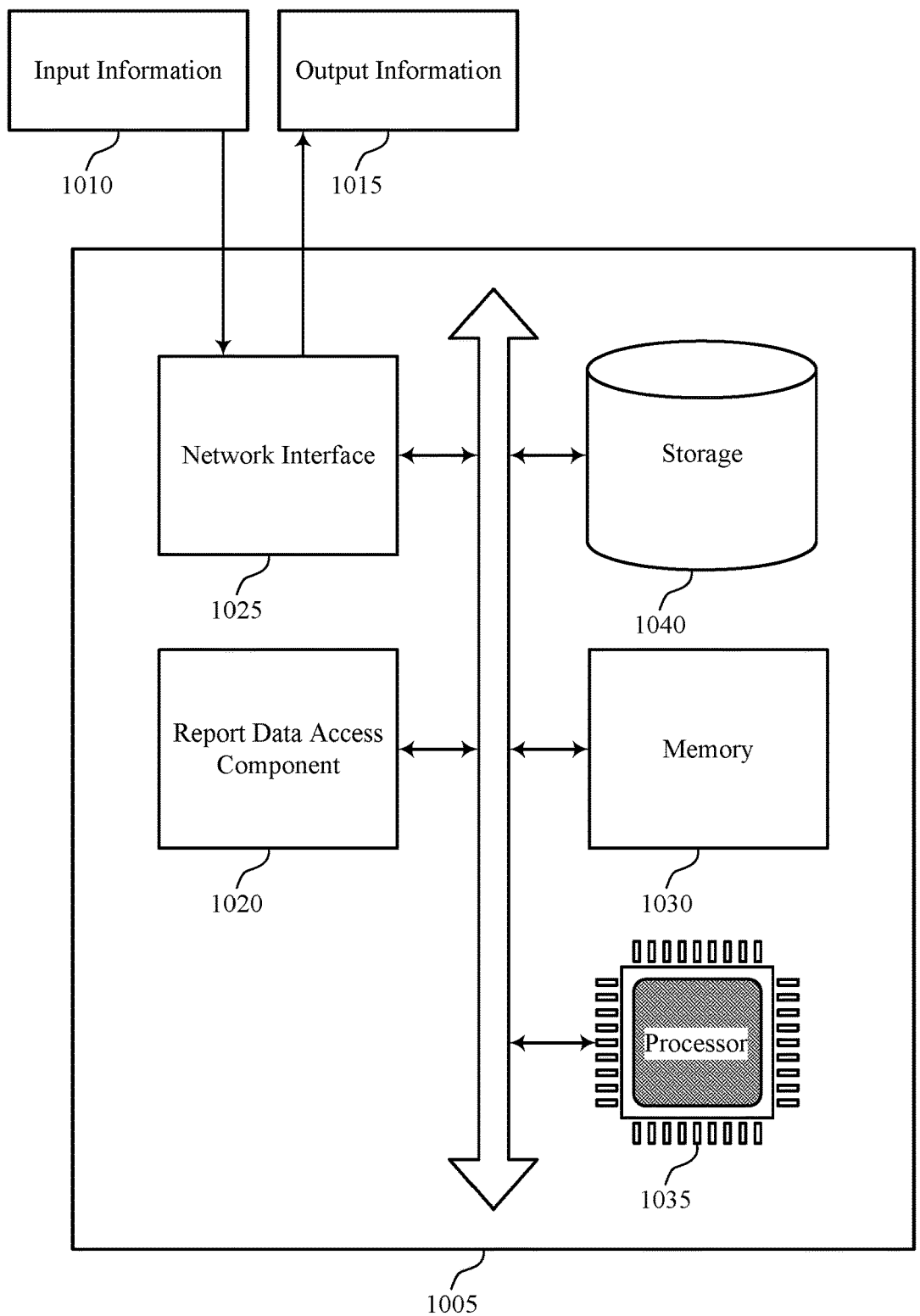
FIG. 10 illustrates a diagram of a system including a device that supports access authorization for report data in a multi-tenancy DMS in accordance with aspects of the present disclosure.

FIG. 10 illustrates a block diagram 1000 of a system 1005 that supports access authorization for report data in a multi-tenancy DMS in accordance with aspects of the present disclosure. The system 1005 may be an example of or include the components of a system 705, a system 805, or a DMS as described herein. The system 1005 may include components for data management, including components such as a report data access component 1020, an input information 1010, an output information 1015, a network interface 1025, a memory 1030, a processor 1035, and a storage 1040. These components may be in electronic communication or otherwise coupled with each other (e.g., operatively, communicatively, functionally, electronically, electrically: via one or more buses, communications links, communications interfaces, or any combination thereof). Additionally, the components of the system 1005 may include corresponding physical components or may be implemented as corresponding virtual components (e.g., components of one or more virtual machines). In some examples, the system 1005 may be an example of aspects of one or more components described with reference to FIG. 1, such as a DMS 110.

The network interface 1025 may enable the system 1005 to exchange information (e.g., input information 1010, output information 1015, or both) with other systems or devices (not shown). For example, the network interface 1025 may enable the system 1005 to connect to a network (e.g., a network 120 as described herein). The network interface 1025 may include one or more wireless network interfaces, one or more wired network interfaces, or any combination thereof. In some examples, the network interface 1025 may be an example of may be an example of aspects of one or more components described with reference to FIG. 1, such as one or more network interfaces 165.

Memory 1030 may include RAM, ROM, or both. The memory 1030 may store computer-readable, computer-executable software including instructions that, when executed, cause the processor 1035 to perform various functions described herein. In some cases, the memory 1030 may contain, among other things, a basic input/output system (BIOS), which may control basic hardware or software operation such as the interaction with peripheral components or devices. In some cases, the memory 1030 may be an example of aspects of one or more components described with reference to FIG. 1, such as one or more memories 175.

The processor 1035 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 1035 may be configured to execute computer-readable instructions stored in a memory 1030 to perform various functions (e.g., functions or tasks supporting access authorization for report data in a multi-tenancy DMS). Though a single processor 1035 is depicted in the example of FIG. 10, it is to be understood that the system 1005 may include any quantity of one or more of processors 1035 and that a group of processors 1035 may collectively perform one or more functions ascribed herein to a processor, such as the processor 1035. In some cases, the processor 1035 may be an example of aspects of one or more components described with reference to FIG. 1, such as one or more processors 170.

Storage 1040 may be configured to store data that is generated, processed, stored, or otherwise used by the system 1005. In some cases, the storage 1040 may include one or more HDDs, one or more SDDs, or both. In some examples, the storage 1040 may be an example of a single database, a distributed database, multiple distributed databases, a data store, a data lake, or an emergency backup database. In some examples, the storage 1040 may be an example of one or more components described with reference to FIG. 1, such as one or more network disks 180.

For example, the report data access component 1020 may be configured as or otherwise support a means for receiving, by a DMS, a request for report data associated with a first set of one or more computing objects of the DMS, where the DMS is operable to provide protection for data sources associated with a set of multiple tenants of the DMS, and where computing objects of the DMS are organized as a hierarchy of computing objects. The report data access component 1020 may be configured as or otherwise support a means for identifying context information for a log-in session associated with the request to access the report data, where the context information for the log-in session includes a tenant ID for a tenant associated with the request, the tenant included in the set of multiple tenants. The report data access component 1020 may be configured as or otherwise support a means for applying a filter to the first set of one or more computing objects associated with the requested report data, where the filter is based on a second set of one or more computing objects to which the tenant associated with the request has access within the hierarchy of computing objects. The report data access component 1020 may be configured as or otherwise support a means for outputting, in response to applying the filter, the report data for at least one computing object of the first set of one or more computing objects based on the at least one computing object being included in the second set of one or more computing objects.

By including or configuring the report data access component 1020 in accordance with examples as described herein, the system 1005 may support techniques for access authorization for report data in a multi-tenancy DMS, which may provide one or more benefits such as, for example, improved data management, compliance, efficiency, and security, among other possibilities.

Figure 11:
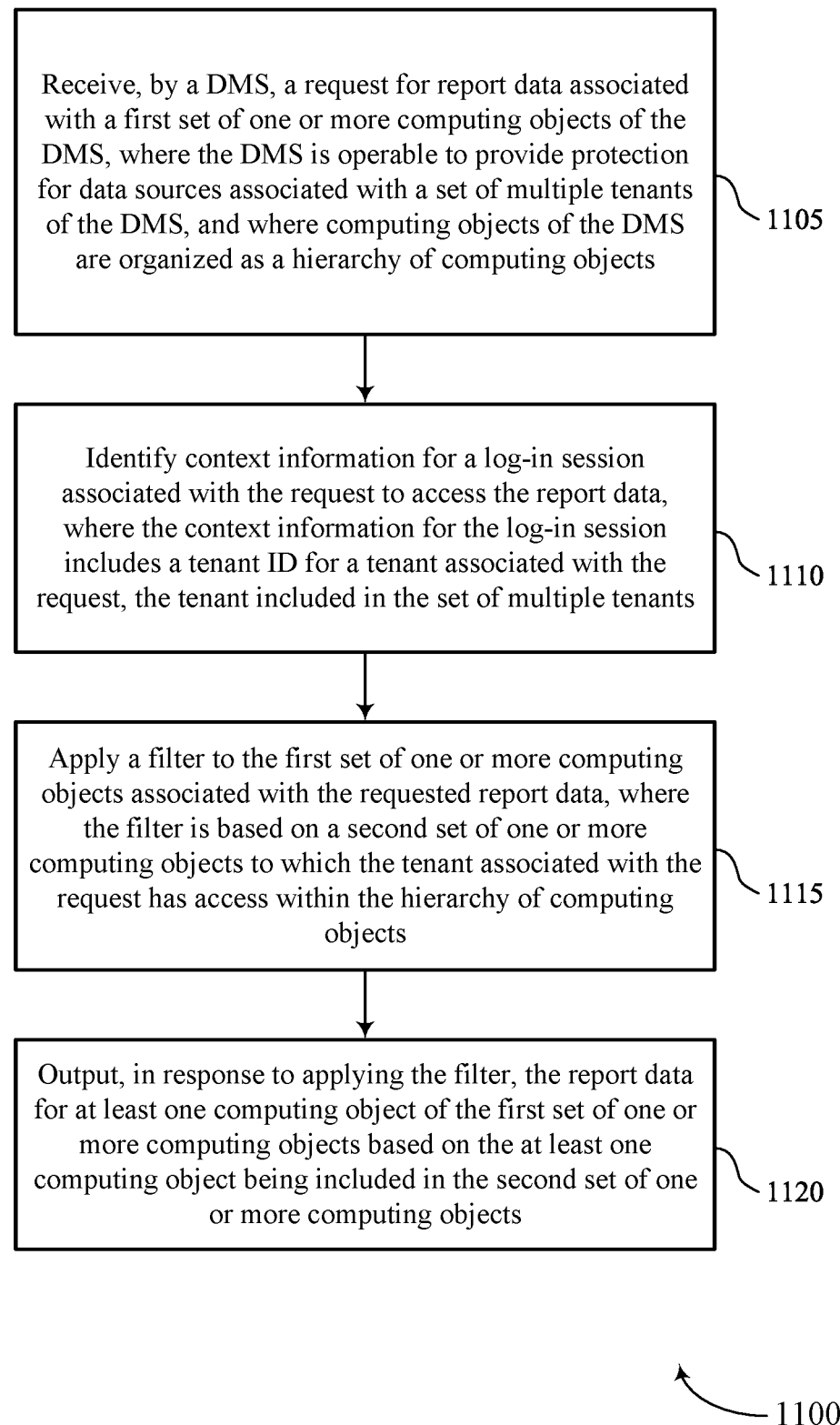
FIGS. 11 through 14 illustrate flowcharts showing methods that support access authorization for report data in a multi-tenancy DMS in accordance with aspects of the present disclosure.

FIG. 11 illustrates a flowchart showing a method 1100 that supports access authorization for report data in a multi-tenancy DMS in accordance with aspects of the present disclosure. The operations of the method 1100 may be implemented by a DMS or its components as described herein. For example, the operations of the method 1100 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1105, the method may include receiving, by a DMS, a request for report data associated with a first set of one or more computing objects of the DMS, where the DMS is operable to provide protection for data sources associated with a set of multiple tenants of the DMS, and where computing objects of the DMS are organized as a hierarchy of computing objects. The operations of 1105 may be performed in accordance with examples as disclosed herein. In some examples, aspects of the operations of 1105 may be performed by a report data request component 925 as described with reference to FIG. 9.

At 1110, the method may include identifying context information for a log-in session associated with the request to access the report data, where the context information for the log-in session includes a tenant ID for a tenant associated with the request, the tenant included in the set of multiple tenants. The operations of 1110 may be performed in accordance with examples as disclosed herein. In some examples, aspects of the operations of 1110 may be performed by a context information component 930 as described with reference to FIG. 9.

At 1115, the method may include applying a filter to the first set of one or more computing objects associated with the requested report data, where the filter is based on a second set of one or more computing objects to which the tenant associated with the request has access within the hierarchy of computing objects. The operations of 1115 may be performed in accordance with examples as disclosed herein. In some examples, aspects of the operations of 1115 may be performed by an access authorization component 935 as described with reference to FIG. 9.

At 1120, the method may include outputting, in response to applying the filter, the report data for at least one computing object of the first set of one or more computing objects based on the at least one computing object being included in the second set of one or more computing objects. The operations of 1120 may be performed in accordance with examples as disclosed herein. In some examples, aspects of the operations of 1120 may be performed by a report data component 940 as described with reference to FIG. 9.

Figure 12:
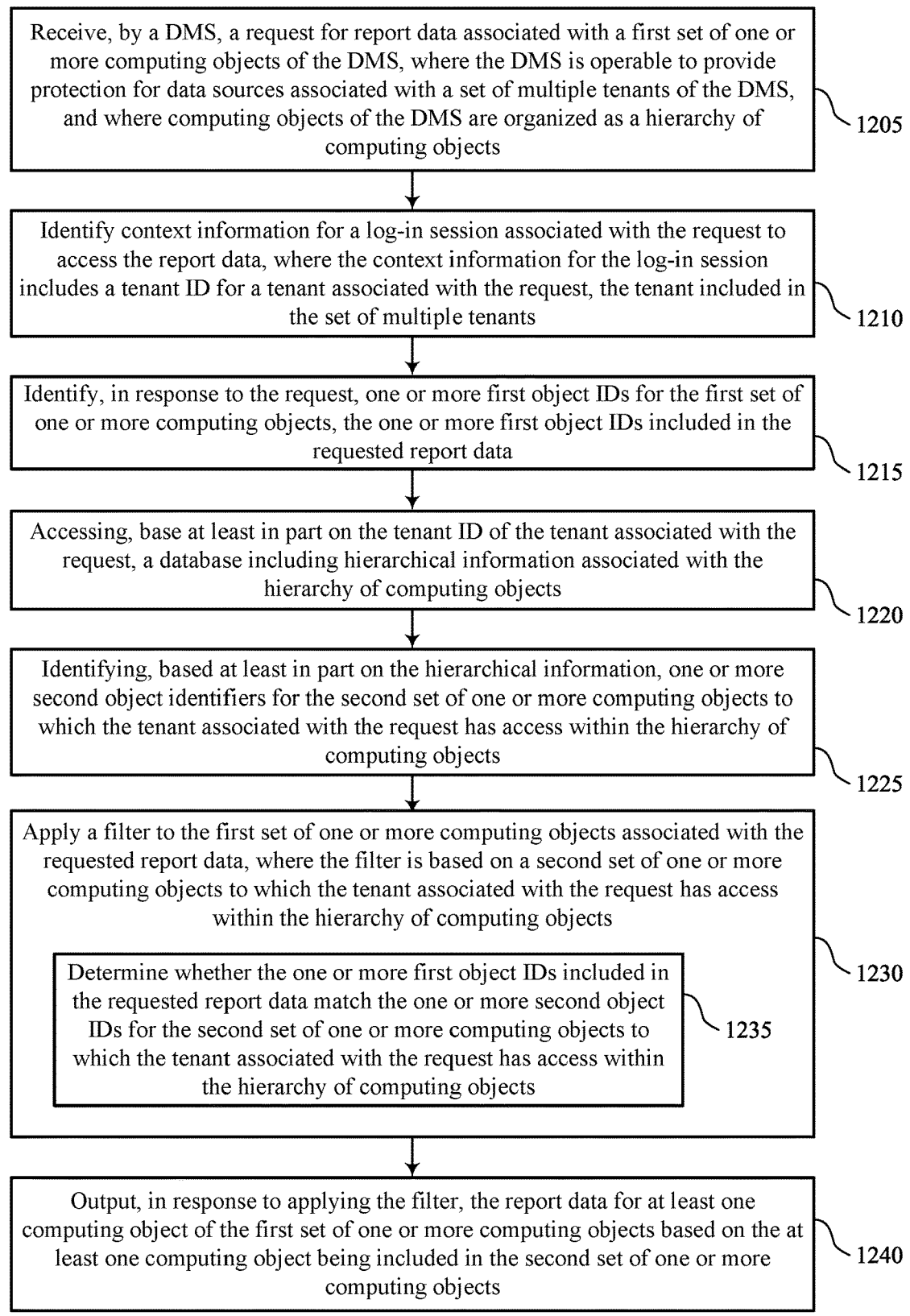

FIG. 12 illustrates a flowchart showing a method 1200 that supports access authorization for report data in a multi-tenancy DMS in accordance with aspects of the present disclosure. The operations of the method 1200 may be implemented by a DMS or its components as described herein. For example, the operations of the method 1200 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1205, the method may include receiving, by a DMS, a request for report data associated with a first set of one or more computing objects of the DMS, where the DMS is operable to provide protection for data sources associated with a set of multiple tenants of the DMS, and where computing objects of the DMS are organized as a hierarchy of computing objects. The operations of 1205 may be performed in accordance with examples as disclosed herein. In some examples, aspects of the operations of 1205 may be performed by a report data request component 925 as described with reference to FIG. 9.

At 1210, the method may include identifying context information for a log-in session associated with the request to access the report data, where the context information for the log-in session includes a tenant ID for a tenant associated with the request, the tenant included in the set of multiple tenants. The operations of 1210 may be performed in accordance with examples as disclosed herein. In some examples, aspects of the operations of 1210 may be performed by a context information component 930 as described with reference to FIG. 9.

At 1215, the method may include identifying, in response to the request, one or more first object IDs for the first set of one or more computing objects, the one or more first object IDs included in the requested report data. The operations of 1215 may be performed in accordance with examples as disclosed herein. In some examples, aspects of the operations of 1215 may be performed by an object ID component 945 as described with reference to FIG. 9.

At 1220, the method may include accessing, based on the tenant ID of the tenant associated with the request, a database including hierarchical information associated with the hierarchy of computing objects. The operations of 1220 may be performed in accordance with examples as disclosed herein. In some examples, aspects of the operations of 1220 may be performed by a hierarchy component 950 as described with reference to FIG. 9.

At 1225, the method may include identifying, based on the hierarchical information, one or more second object IDs for the second set of one or more computing objects to which the tenant associated with the request has access within the hierarchy of computing objects. The operations of 1225 may be performed in accordance with examples as disclosed herein. In some examples, aspects of the operations of 1225 may be performed by an object ID component 945 as described with reference to FIG. 9.

At 1230, the method may include applying a filter to the first set of one or more computing objects associated with the requested report data, where the filter is based on a second set of one or more computing objects to which the tenant associated with the request has access within the hierarchy of computing objects. In some examples, at 1235, applying the filter may include determining whether the one or more first object IDs included in the requested report data match the one or more second object IDs for the second set of one or more computing objects to which the tenant associated with the request has access within the hierarchy of computing objects. The operations of 1230 and 1235 may be performed in accordance with examples as disclosed herein. In some examples, aspects of the operations of 1230 and 1335 may be performed by an access authorization component 935 as described with reference to FIG. 9.

At 1240, the method may include outputting, in response to applying the filter, the report data for at least one computing object of the first set of one or more computing objects based on the at least one computing object being included in the second set of one or more computing objects. The operations of 1240 may be performed in accordance with examples as disclosed herein. In some examples, aspects of the operations of 1240 may be performed by a report data component 940 as described with reference to FIG. 9.

Figure 13:
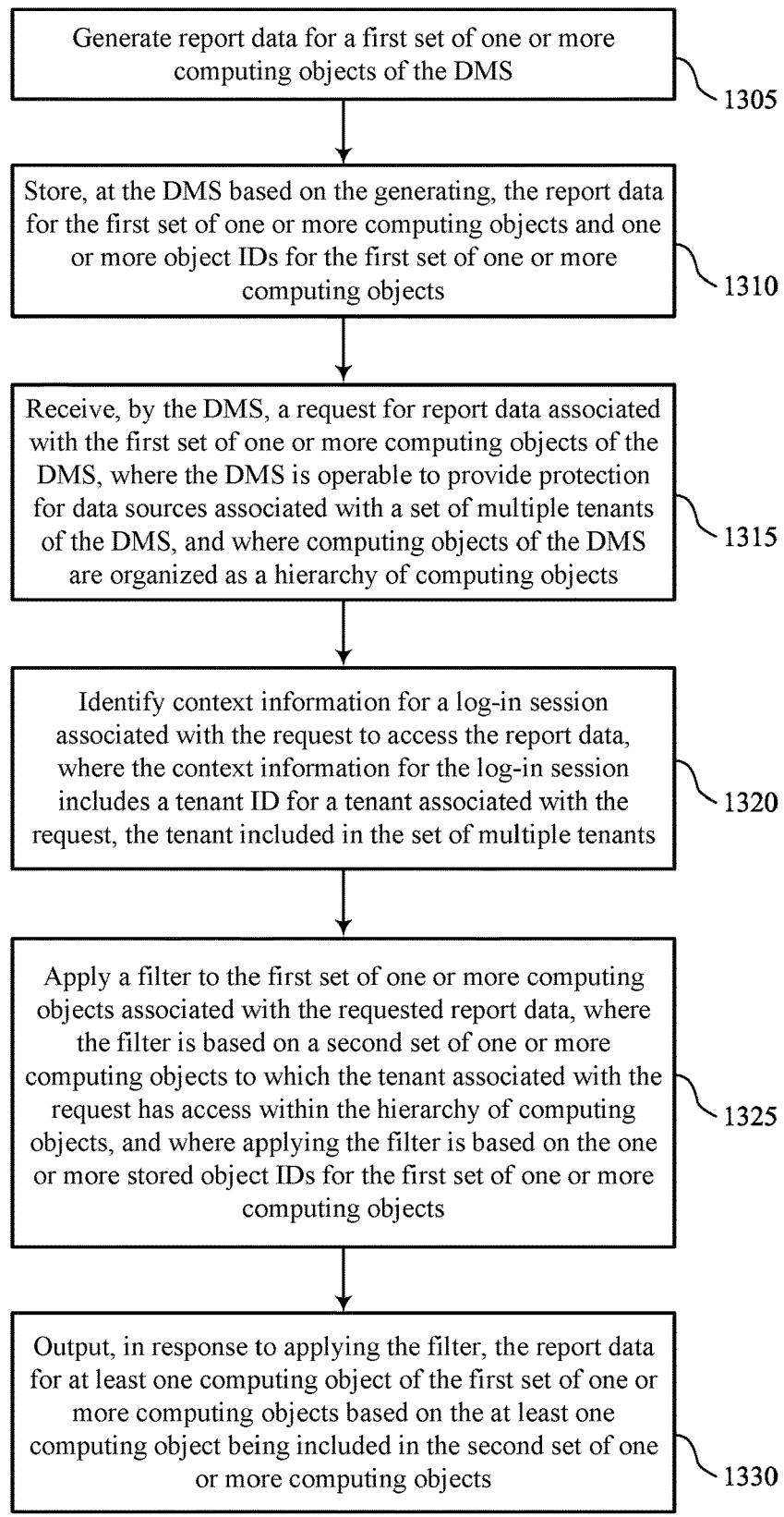

FIG. 13 illustrates a flowchart showing a method 1300 that supports access authorization for report data in a multi-tenancy DMS in accordance with aspects of the present disclosure. The operations of the method 1300 may be implemented by a DMS or its components as described herein. For example, the operations of the method 1300 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1305, the method may include generating report data for a first set of one or more computing objects of the DMS. The operations of 1305 may be performed in accordance with examples as disclosed herein. In some examples, aspects of the operations of 1305 may be performed by a report data component 940 as described with reference to FIG. 9.

At 1310, the method may include storing, at the DMS based on the generating, the report data for the first set of one or more computing objects and one or more object IDs for the first set of one or more computing objects. The operations of 1310 may be performed in accordance with examples as disclosed herein. In some examples, aspects of the operations of 1310 may be performed by a report data storage component 955 as described with reference to FIG. 9.

At 1315, the method may include receiving, by the DMS, a request for the report data associated with the first set of one or more computing objects of the DMS, where the DMS is operable to provide protection for data sources associated with a set of multiple tenants of the DMS, and where computing objects of the DMS are organized as a hierarchy of computing objects. The operations of 1315 may be performed in accordance with examples as disclosed herein. In some examples, aspects of the operations of 1315 may be performed by a report data request component 925 as described with reference to FIG. 9.

At 1320, the method may include identifying context information for a log-in session associated with the request to access the report data, where the context information for the log-in session includes a tenant ID for a tenant associated with the request, the tenant included in the set of multiple tenants. The operations of 1320 may be performed in accordance with examples as disclosed herein. In some examples, aspects of the operations of 1320 may be performed by a context information component 930 as described with reference to FIG. 9.

At 1325, the method may include applying a filter to the first set of one or more computing objects associated with the requested report data, where the filter is based on a second set of one or more computing objects to which the tenant associated with the request has access within the hierarchy of computing objects, and where applying the filter is based on the one or more stored object IDs for the first set of one or more computing objects. The operations of 1325 may be performed in accordance with examples as disclosed herein. In some examples, aspects of the operations of 1325 may be performed by an access authorization component 935 as described with reference to FIG. 9.

At 1330, the method may include outputting, in response to applying the filter, the report data for at least one computing object of the first set of one or more computing objects based on the at least one computing object being included in the second set of one or more computing objects. The operations of 1330 may be performed in accordance with examples as disclosed herein. In some examples, aspects of the operations of 1330 may be performed by a report data component 940 as described with reference to FIG. 9.

Figure 14:
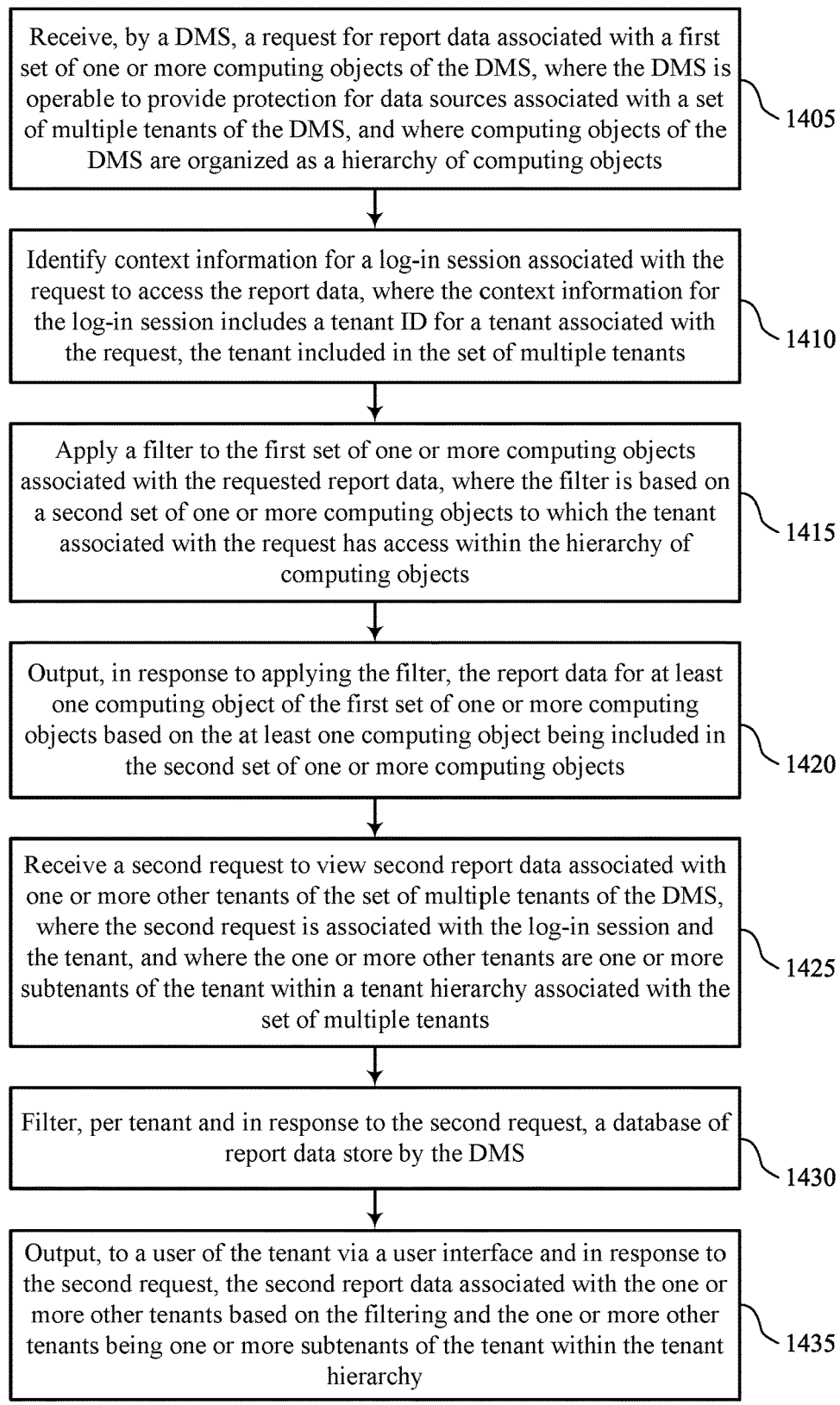

FIG. 14 illustrates a flowchart showing a method 1400 that supports access authorization for report data in a multi-tenancy DMS in accordance with aspects of the present disclosure. The operations of the method 1400 may be implemented by a DMS or its components as described herein. For example, the operations of the method 1400 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1405, the method may include receiving, by a DMS, a request for report data associated with a first set of one or more computing objects of the DMS, where the DMS is operable to provide protection for data sources associated with a set of multiple tenants of the DMS, and where computing objects of the DMS are organized as a hierarchy of computing objects. The operations of 1405 may be performed in accordance with examples as disclosed herein. In some examples, aspects of the operations of 1405 may be performed by a report data request component 925 as described with reference to FIG. 9.

At 1410, the method may include identifying context information for a log-in session associated with the request to access the report data, where the context information for the log-in session includes a tenant ID for a tenant associated with the request, the tenant included in the set of multiple tenants. The operations of 1410 may be performed in accordance with examples as disclosed herein. In some examples, aspects of the operations of 1410 may be performed by a context information component 930 as described with reference to FIG. 9.

At 1415, the method may include applying a filter to the first set of one or more computing objects associated with the requested report data, where the filter is based on a second set of one or more computing objects to which the tenant associated with the request has access within the hierarchy of computing objects. The operations of 1415 may be performed in accordance with examples as disclosed herein. In some examples, aspects of the operations of 1415 may be performed by an access authorization component 935 as described with reference to FIG. 9.

At 1420, the method may include outputting, in response to applying the filter, the report data for at least one computing object of the first set of one or more computing objects based on the at least one computing object being included in the second set of one or more computing objects. The operations of 1420 may be performed in accordance with examples as disclosed herein. In some examples, aspects of the operations of 1420 may be performed by a report data component 940 as described with reference to FIG. 9.

At 1425, the method may include receiving a second request to view second report data associated with one or more other tenants of the set of multiple tenants of the DMS, where the second request is associated with the log-in session and the tenant, and where the one or more other tenants are one or more subtenants of the tenant within a tenant hierarchy associated with the set of multiple tenants. The operations of 1425 may be performed in accordance with examples as disclosed herein. In some examples, aspects of the operations of 1425 may be performed by a report data request component 925 as described with reference to FIG. 9.

At 1430, the method may include filtering, per tenant and in response to the second request, a database of report data stored by the DMS. The operations of 1430 may be performed in accordance with examples as disclosed herein. In some examples, aspects of the operations of 1430 may be performed by a report data filtering component 960 as described with reference to FIG. 9.

At 1435, the method may include outputting, to a user of the tenant via a user interface and in response to the second request, the second report data associated with the one or more other tenants based on the filtering and the one or more other tenants being one or more subtenant of the tenant within the tenant hierarchy. The operations of 1435 may be performed in accordance with examples as disclosed herein. In some examples, aspects of the operations of 1435 may be performed by a report data filtering component 960 as described with reference to FIG. 9.

A method is described. The method may include receiving, by a DMS, a request for report data associated with a first set of one or more computing objects of the DMS, where the DMS is operable to provide protection for data sources associated with a set of multiple tenants of the DMS, and where computing objects of the DMS are organized as a hierarchy of computing objects, identifying context information for a log-in session associated with the request to access the report data, where the context information for the log-in session includes a tenant ID for a tenant associated with the request, the tenant included in the set of multiple tenants, applying a filter to the first set of one or more computing objects associated with the requested report data, where the filter is based on a second set of one or more computing objects to which the tenant associated with the request has access within the hierarchy of computing objects, and outputting, in response to applying the filter, the report data for at least one computing object of the first set of one or more computing objects based on the at least one computing object being included in the second set of one or more computing objects.

An apparatus is described. The apparatus may include a processor, memory coupled with the processor, and instructions stored in the memory. The instructions may be executable by the processor to cause the apparatus to receive, by a DMS, a request for report data associated with a first set of one or more computing objects of the DMS, where the DMS is operable to provide protection for data sources associated with a set of multiple tenants of the DMS, and where computing objects of the DMS are organized as a hierarchy of computing objects, identify context information for a log-in session associated with the request to access the report data, where the context information for the log-in session includes a tenant ID for a tenant associated with the request, the tenant included in the set of multiple tenants, apply a filter to the first set of one or more computing objects associated with the requested report data, where the filter is based on a second set of one or more computing objects to which the tenant associated with the request has access within the hierarchy of computing objects, and output, in response to applying the filter, the report data for at least one computing object of the first set of one or more computing objects based on the at least one computing object being included in the second set of one or more computing objects.

Another apparatus is described. The apparatus may include means for receiving, by a DMS, a request for report data associated with a first set of one or more computing objects of the DMS, where the DMS is operable to provide protection for data sources associated with a set of multiple tenants of the DMS, and where computing objects of the DMS are organized as a hierarchy of computing objects, means for identifying context information for a log-in session associated with the request to access the report data, where the context information for the log-in session includes a tenant ID for a tenant associated with the request, the tenant included in the set of multiple tenants, means for applying a filter to the first set of one or more computing objects associated with the requested report data, where the filter is based on a second set of one or more computing objects to which the tenant associated with the request has access within the hierarchy of computing objects, and means for outputting, in response to applying the filter, the report data for at least one computing object of the first set of one or more computing objects based on the at least one computing object being included in the second set of one or more computing objects.

A non-transitory computer-readable medium storing code is described. The code may include instructions executable by a processor to receive, by a DMS, a request for report data associated with a first set of one or more computing objects of the DMS, where the DMS is operable to provide protection for data sources associated with a set of multiple tenants of the DMS, and where computing objects of the DMS are organized as a hierarchy of computing objects, identify context information for a log-in session associated with the request to access the report data, where the context information for the log-in session includes a tenant ID for a tenant associated with the request, the tenant included in the set of multiple tenants, apply a filter to the first set of one or more computing objects associated with the requested report data, where the filter is based on a second set of one or more computing objects to which the tenant associated with the request has access within the hierarchy of computing objects, and output, in response to applying the filter, the report data for at least one computing object of the first set of one or more computing objects based on the at least one computing object being included in the second set of one or more computing objects.

Some examples of the method, apparatuses, and non-transitory computer-readable medium described herein may further include operations, features, means, or instructions for identifying, in response to the request, one or more first object IDs for the first set of one or more computing objects, the one or more first object IDs included in the requested report data, accessing, based on the tenant ID of the tenant associated with the request, a database including hierarchical information associated with the hierarchy of computing objects, and identifying, based on the hierarchical information, one or more second object IDs for the second set of one or more computing objects to which the tenant associated with the request may have access within the hierarchy of computing objects. In some examples of the method, apparatuses, and non-transitory computer-readable medium described herein, applying the filter includes determining whether the one or more first object IDs included in the requested report data match the one or more second object IDs for the second set of one or more computing objects to which the tenant associated with the request has access within the hierarchy of computing objects.

In some examples of the method, apparatuses, and non-transitory computer-readable medium described herein, the hierarchical information includes a set of multiple rows of information and a row of the set of multiple rows includes the tenant ID of the tenant associated with the request and further includes the one or more second object IDs for the second set of one or more computing objects to which the tenant may have access within the hierarchy of computing objects.

Some examples of the method, apparatuses, and non-transitory computer-readable medium described herein may further include operations, features, means, or instructions for generating the report data for the first set of one or more computing objects and storing, at the DMS based on the generating, the report data for the first set of one or more computing objects and one or more object IDs for the first set of one or more computing objects, where applying the filter may be based on the one or more stored object IDs for the first set of one or more computing objects.

In some examples of the method, apparatuses, and non-transitory computer-readable medium described herein, storing the one or more object IDs for the first set of one or more computing objects may include operations, features, means, or instructions for storing a first object ID for a first computing object of the first set of one or more computing objects in a first field of the report data, where the first field may be included in a first row that includes report data associated with the first computing object and storing a second object ID for a second computing object of the first set of one or more computing objects in a second field of the report data, where the second field may be included in a second row that includes report data associated with the second computing object.

Some examples of the method, apparatuses, and non-transitory computer-readable medium described herein may further include operations, features, means, or instructions for receiving a second request to view second report data associated with one or more other tenants of the set of multiple tenants of the DMS, where the second request may be associated with the log-in session and the tenant, and where the one or more other tenants may be one or more subtenants of the tenant within a tenant hierarchy associated with the set of multiple tenants, filtering, per tenant and in response to the second request, a database of report data stored by the DMS, and outputting, to a user of the tenant via a user interface and in response to the second request, the second report data associated with the one or more other tenants based on the filtering and the one or more other tenants being one or more subtenants of the tenant within the tenant hierarchy.

In some examples of the method, apparatuses, and non-transitory computer-readable medium described herein, accessing, based on the second request, a mapping table that includes mapping information for a set of multiple computing objects of the DMS, where the mapping information for a computing object of the set of multiple computing objects indicates at least one tenant that may have access to the computing object within the hierarchy of computing objects, selecting, from among the set of multiple computing objects of the DMS based on accessing the mapping table, one or more object IDs for a third set of one or more computing objects to which the one or more other tenants may have access within the hierarchy of computing objects, where selecting the one or more object IDs for the third set of one or more computing objects may be based on mapping information for the third set of one of more computing objects in the mapping table including one or more tenant IDs for the one or more other tenants, and identifying, after selecting the one or more object IDs of the third set of one or more computing objects, the second report data from among the database of report data based on the second report data including the one or more object IDs for the third set of one or more computing objects, where filtering the database of report data for the one or more other tenants may be based on the identifying.

Some examples of the method, apparatuses, and non-transitory computer-readable medium described herein may further include operations, features, means, or instructions for identifying the third set of one or more computing objects to which the one or more other tenants may have access within the hierarchy of computing objects and storing the one or more tenant IDs of the one or more other tenants in a set of one or more rows of the mapping table, the set of one or more rows indexed by the one or more object IDs for the third set of one or more computing objects.

Some examples of the method, apparatuses, and non-transitory computer-readable medium described herein may further include operations, features, means, or instructions for refraining from outputting second report data for a second computing object of the first set of one or more computing objects based on the second computing object being absent from the second set of one or more computing objects.

In some examples of the method, apparatuses, and non-transitory computer-readable medium described herein, the report data for the first set of one or more computing objects includes a compliance status, a size, a status of one or more tasks, or any combination thereof associated with at the least one computing object of the first set of one or more computing objects.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    generating, by a data management system, report data associated with a first set of one or more computing objects of the data management system, wherein the data management system is operable to provide protection for data sources associated with a plurality of tenants of the data management system, and wherein computing objects of the data management system are organized as a hierarchy of computing objects;
    storing, at the data management system based at least in part on the generating, the report data for the first set of one or more computing objects and a mapping between the report data and one or more first object identifiers for the first set of one or more computing objects associated with the report data;
    receiving, by the data management system, a request for the report data associated with the first set of one or more computing objects;
    identifying context information for a log-in session associated with the request to access the report data, wherein the context information for the log-in session comprises a tenant identifier for a tenant associated with the request, the tenant included in the plurality of tenants;
    accessing, based at least in part on the tenant identifier of the tenant associated with the request, a database comprising hierarchical information associated with the hierarchy of computing objects;
    identifying, based at least in part on the hierarchical information, a mapping between the tenant identifier of the tenant and one or more second object identifiers of a second set of one or more computing objects to which the tenant associated with the request has access within the hierarchy of computing objects;
    applying a filter to identify, from among the first set of one or more computing objects associated with the requested report data, at least one computing object that is included in both the first set of one or more computing objects associated with the requested report data and the second set of one or more computing objects to which the tenant associated with the request has access, wherein the filter is based at least in part on the mapping between the report data and the one or more first object identifiers for the first set of one or more computing objects and is further based at least in part on the mapping between the tenant identifier of the tenant and the one or more second object identifiers of the second set of one or more computing objects to which the tenant associated with the request has access within the hierarchy of computing objects; and
    outputting, in response to applying the filter, a portion of the report data that is associated with the at least one computing object of the first set of one or more computing objects based at least in part on the at least one computing object being included in both the first set of one or more computing objects and the second set of one or more computing objects.

2. The method of claim 1, further comprising:
    identifying, in response to the request, the one or more first object identifiers for the first set of one or more computing objects, the one or more first object identifiers included in the requested report data, wherein applying the filter comprises:
        determining whether the one or more first object identifiers included in the requested report data match the one or more second object identifiers for the second set of one or more computing objects to which the tenant associated with the request has access within the hierarchy of computing objects.

3. The method of claim 2, wherein:
    the hierarchical information comprises a plurality of rows of information; and
    a row of the plurality of rows comprises the tenant identifier of the tenant associated with the request and further comprises the one or more second object identifiers for the second set of one or more computing objects to which the tenant has access within the hierarchy of computing objects.

4. The method of claim 1, wherein storing the one or more first object identifiers for the first set of one or more computing objects comprises:
    storing a first object identifier for a first computing object of the first set of one or more computing objects in a first field of the report data, wherein the first field is included in a first row that comprises report data associated with the first computing object; and
    storing a second object identifier for a second computing object of the first set of one or more computing objects in a second field of the report data, wherein the second field is included in a second row that comprises report data associated with the second computing object.

5. The method of claim 1, further comprising:
    receiving a second request to view second report data associated with one or more other tenants of the plurality of tenants of the data management system, wherein the second request is associated with the log-in session and the tenant, and wherein the one or more other tenants are one or more subtenants of the tenant within a tenant hierarchy associated with the plurality of tenants;

filtering, per tenant and in response to the second request, a database of report data stored by the data management system; and outputting, to a user of the tenant via a user interface and in response to the second request, the second report data associated with the one or more other tenants based at least in part on the filtering and the one or more other tenants being one or more subtenants of the tenant within the tenant hierarchy.

6. The method of claim 5, further comprising:

accessing, based at least in part on the second request, a mapping table that comprises mapping information for a plurality of computing objects of the data management system, wherein the mapping information for a computing object of the plurality of computing objects indicates at least one tenant that has access to the computing object within the hierarchy of computing objects;

selecting, from among the plurality of computing objects of the data management system based at least in part on accessing the mapping table, one or more object identifiers for a third set of one or more computing objects to which the one or more other tenants have access within the hierarchy of computing objects, wherein selecting the one or more object identifiers for the third set of one or more computing objects is based at least in part on mapping information for the third set of one or more computing objects in the mapping table comprising one or more second identifiers for the one or more other tenants; and identifying, after selecting the one or more object identifiers of the third set of one or more computing objects, the second report data from among the database of report data based at least in part on the second report data comprising the one or more object identifiers for the third set of one or more computing objects, wherein filtering the database of report data for the one or more other tenants is based at least in part on the identifying.

7. The method of claim 6, further comprising:

identifying the third set of one or more computing objects to which the one or more other tenants have access within the hierarchy of computing objects; and storing the one or more second identifiers of the one or more other tenants in a set of one or more rows of the mapping table, the set of one or more rows indexed by the one or more object identifiers for the third set of one or more computing objects.

8. The method of claim 1, further comprising:

refraining from outputting second report data for a second computing object of the first set of one or more computing objects based at least in part on the second computing object being absent from the second set of one or more computing objects.

9. The method of claim 1, wherein the report data for the first set of one or more computing objects comprises a compliance status, a size, a status of one or more tasks, or any combination thereof associated with the at least one computing object of the first set of one or more computing objects.

10. An apparatus, comprising:

at least one processor;

memory coupled with the at least one processor; and instructions stored in the memory and executable by the at least one processor to cause the apparatus to:

generate, by a data management system, report data associated with a first set of one or more computing objects of the data management system, wherein the data management system is operable to provide protection for data sources associated with a plurality of tenants of the data management system, and wherein computing objects of the data management system are organized as a hierarchy of computing objects;

store, at the data management system based at least in part on the generating, the report data for the first set of one or more computing objects and a mapping between the report data and one or more first object identifiers for the first set of one or more computing objects associated with the report data;

receive, by the data management system, a request for the report data associated with the first set of one or more computing objects;

identify context information for a log-in session associated with the request to access the report data, wherein the context information for the log-in session comprises a tenant identifier for a tenant associated with the request, the tenant included in the plurality of tenants;

access, based at least in part on the tenant identifier of the tenant associated with the request, a database comprising hierarchical information associated with the hierarchy of computing objects;

identify, based at least in part on the hierarchical information, a mapping between the tenant identifier of the tenant and one or more second object identifiers of a second set of one or more computing objects to which the tenant associated with the request has access within the hierarchy of computing objects;

apply a filter to identify, from among the first set of one or more computing objects associated with the requested report data, at least one computing object that is included in both the first set of one or more computing objects associated with the requested report data and the second set of one or more computing objects to which the tenant associated with the request has access, wherein the filter is based at least in part on the mapping between the report data and the one or more first object identifiers for the first set of one or more computing objects and is further based at least in part on the mapping between the tenant identifier of the tenant and the one or more second object identifiers of the second set of one or more computing objects to which the tenant associated with the request has access within the hierarchy of computing objects; and output, in response to applying the filter, a portion of the report data that is associated with the at least one computing object of the first set of one or more computing objects based at least in part on the at least one computing object being included in both the first set of one or more computing objects and the second set of one or more computing objects.

11. The apparatus of claim 10, wherein the instructions are further executable by the at least one processor to cause the apparatus to:

identify, in response to the request, the one or more first object identifiers for the first set of one or more computing objects, the one or more first object identifiers included in the requested report data, wherein, to apply the filter, the instructions are executable by the at least one processor to cause the apparatus to:
  determine whether the one or more first object identifiers included in the requested report data match the one or more second object identifiers for the second set of one or more computing objects to which the tenant associated with the request has access within the hierarchy of computing objects.

12. The apparatus of claim 11, wherein:
  the hierarchical information comprises a plurality of rows of information; and
  a row of the plurality of rows comprises the tenant identifier of the tenant associated with the request and further comprises the one or more second object identifiers for the second set of one or more computing objects to which the tenant has access within the hierarchy of computing objects.

13. The apparatus of claim 10, wherein, to store the one or more first object identifiers for the first set of one or more computing objects, the instructions are executable by the at least one processor to cause the apparatus to:
  store a first object identifier for a first computing object of the first set of one or more computing objects in a first field of the report data, wherein the first field is included in a first row that comprises report data associated with the first computing object; and
  store a second object identifier for a second computing object of the first set of one or more computing objects in a second field of the report data, wherein the second field is included in a second row that comprises report data associated with the second computing object.

14. The apparatus of claim 10, wherein the instructions are further executable by the at least one processor to cause the apparatus to:
  receive a second request to view second report data associated with one or more other tenants of the plurality of tenants of the data management system, wherein the second request is associated with the log-in session and the tenant, and wherein the one or more other tenants are one or more subtenants of the tenant within a tenant hierarchy associated with the plurality of tenants;
  filter, per tenant and in response to the second request, a database of report data stored by the data management system; and
  output, to a user of the tenant via a user interface and in response to the second request, the second report data associated with the one or more other tenants based at least in part on the filtering and the one or more other tenants being one or more subtenants of the tenant within the tenant hierarchy.

15. A non-transitory computer-readable medium storing code, the code comprising instructions executable by a processor to:
  generate, by a data management system, report data associated with a first set of one or more computing objects of the data management system, wherein the data management system is operable to provide protection for data sources associated with a plurality of tenants of the data management system, and wherein computing objects of the data management system are organized as a hierarchy of computing objects;
  store, at the data management system based at least in part on the generating, the report data for the first set of one or more computing objects and a mapping between the report data and one or more first object identifiers for the first set of one or more computing objects associated with the report data;
  receive, by the data management system, a request for the report data associated with the first set of one or more computing objects;
  identify context information for a log-in session associated with the request to access the report data, wherein the context information for the log-in session comprises a tenant identifier for a tenant associated with the request, the tenant included in the plurality of tenants;
  access, based at least in part on the tenant identifier of the tenant associated with the request, a database comprising hierarchical information associated with the hierarchy of computing objects;
  identify, based at least in part on the hierarchical information, a mapping between the tenant identifier of the tenant and one or more second object identifiers of a second set of one or more computing objects to which the tenant associated with the request has access within the hierarchy of computing objects;
  apply a filter to identify, from among the first set of one or more computing objects associated with the requested report data, at least one computing object that is included in both the first set of one or more computing objects associated with the requested report data and the second set of one or more computing objects to which the tenant associated with the request has access, wherein the filter is based at least in part on the mapping between the report data and the one or more first object identifiers for the first set of one or more computing objects and is further based at least in part on the mapping between the tenant identifier of the tenant and the one or more second object identifiers of the second set of one or more computing objects to which the tenant associated with the request has access within the hierarchy of computing objects; and
  output, in response to applying the filter, a portion of the report data that is associated with the at least one computing object of the first set of one or more computing objects based at least in part on the at least one computing object being included in both the first set of one or more computing objects and the second set of one or more computing objects.

16. The non-transitory computer-readable medium of claim 15, wherein the instructions are further executable by the processor to:
  identify, in response to the request, the one or more first object identifiers for the first set of one or more computing objects, the one or more first object identifiers included in the requested report data, wherein, to apply the filter, the instructions are executable by the processor to:
    determine whether the one or more first object identifiers included in the requested report data match the one or more second object identifiers for the second set of one or more computing objects to which the tenant associated with the request has access within the hierarchy of computing objects.

17. The non-transitory computer-readable medium of claim 16, wherein:
  the hierarchical information comprises a plurality of rows of information; and
  a row of the plurality of rows comprises the tenant identifier of the tenant associated with the request and further comprises the one or more second object identifiers for the second set of one or more computing objects to which the tenant has access within the hierarchy of computing objects.

* * * * *